US012624679B2

(12) United States Patent (10) Patent No.: US 12,624,679 B2

Shin et al. (45) Date of Patent: May 12, 2026

(54) POWER GENERATOR AND FLUID SUPPLY DEVICE HAVING THE SAME

(71) Applicant: Pukyong National University Industry-University Cooperation Foundation, Busan (KR)

(72) Inventors: Joong Ho Shin, Busan (KR); Won Han, Busan (KR); Se Been Park, Busan (KR)

(73) Assignee: Pukyong National University Industry-University Cooperation Foundation, Busan (KR)

( * ) Notice: Subject to any disclaimer, the term of this patent is extended or adjusted under 35 U.S.C. 154(b) by 76 days.

(21) Appl. No.: 18/736,792

(22) Filed: Jun. 7, 2024

(65) Prior Publication Data

US 2024/0410342 A1 Dec. 12, 2024

(30) Foreign Application Priority Data

Jun. 8, 2023 (KR) ........................ 10-2023-0073822

(51) Int. Cl.
F03G 1/08 (2006.01)
F03G 1/02 (2006.01)
(52) U.S. Cl.
CPC .............. F03G 1/08 (2013.01); F03G 1/022 (2021.08); *F05B 2260/30* (2013.01);
(Continued)
(58) Field of Classification Search
CPC ... F03G 1/08; F03G 1/02; F03G 1/022; F03G 1/06; F05B 2260/30; F05B 2260/4031;
(Continued)

(56) References Cited

U.S. PATENT DOCUMENTS 1,673,197 A * 6/1928 Kollmann ................. F03G 1/00
267/156
2,493,989 A * 1/1950 Middlestetter .......... F03G 1/029
185/37

(Continued)

FOREIGN PATENT DOCUMENTS

CN 115300717 A 11/2022
JP 2023523104 A 6/2023
KR 102308887 A 10/2021

OTHER PUBLICATIONS

Applicant Has No Information to Disclose: No patent novelty search was performed in this case and neither the Applicant nor the undersigned are aware of any prior art devices or documents which they believe to be material to the invention as claimed. This document is being supplied for informational purposes to the Examiner and is evidence of our desire to comply with the duty of disclosure.

(Continued)

*Primary Examiner* — Marina A Tietjen
(74) *Attorney, Agent, or Firm* — Daniel A. Thomson; Emerson, Thomson & Bennett, LLC

(57) ABSTRACT

A power generator is provided including a first outer case in which an internal space is formed; a first mainspring module having a first spring providing rotational force as it is wound and unwound; a first inner case which covers the first mainspring module and rotates about a rotation axis according to the rotational force provided by the first spring; a second outer case in which an internal space is formed and disposed on the first outer case; a second mainspring module having a second spring providing rotational force as it is wound and unwound; a second inner case which covers the second mainspring module and rotates about the rotation axis according to the rotational force provided by the second spring; and a first holder module coupled to the first outer (Continued)

case to limit the unwinding of the first spring until the unwinding of the second spring is completed.

18 Claims, 14 Drawing Sheets

(52) U.S. Cl.
CPC . *F05B 2260/4031* (2013.01); *F05B 2260/422* (2020.08); *F05B 2260/60* (2013.01)

(58) Field of Classification Search
CPC .. F05B 2260/422; F05B 2260/60; B05B 1/02; B05B 9/03
See application file for complete search history.

(56) References Cited

U.S. PATENT DOCUMENTS

| | | | | | |
|---|---|---|---|---|---|
| 5,590,741 | A | * | 1/1997 | Storms | F03G 1/08 |
| | | | | | 185/10 |
| 6,523,646 | B1 | * | 2/2003 | Gates | F03G 1/02 |
| | | | | | 185/38 |
| 2023/0332579 | A1 | * | 10/2023 | Li | F03G 1/022 |

OTHER PUBLICATIONS

Office Action issued in Korean Application No. 10-2023-0073822 dated Apr. 30, 2025 pp. 1-6.

* cited by examiner

POWER GENERATOR AND FLUID SUPPLY DEVICE HAVING THE SAME

CROSS-REFERENCE TO RELATED APPLICATION

This application claims priority to and the benefit of Korean Patent Application No. 10-2023-0073822, filed on Jun. 8, 2023, the disclosure of which is incorporated herein by reference in its entirety.

TECHNICAL FIELD

The present invention relates to a power generator and a fluid supply device having the same.

BACKGROUND ART

Processes such as blood testing, bacterial detection, environmental monitoring and the like using microfluidic devices require the injection and manipulation of small amounts of fluid. Accordingly, fluid injection is performed by using a fluid supply device.

However, commonly used electric fluid supply devices operate automatically according to power supply. Accordingly, electric fluid supply devices are inevitably expensive as they are equipped with a large number of electric components, and since it is not easy to provide them at each site where fluid injection is required, there has been a problem in that it is difficult to perform microfluidic technology-based blood testing, bacterial detection, environmental monitoring and the like at sites that are not equipped with an electric fluid supply device.

In addition, since the electric fluid supply device operates automatically according power supply, it could not be operated in situations where power was not supplied due to a power outage and the like, and thus, there has been a problem in that it is difficult to perform blood testing, bacteria detection, environmental monitoring and the like.

DISCLOSURE

Technical Problem

The present invention has been devised to solve the above problems, and an object of the present invention is to provide a power generator that can continuously provide power for a certain period of time even in the absence of power supply, and a fluid supply device having the same.

In addition, an object of the present invention is to provide a power generator that can control the time for providing power as needed, and a fluid supply device having the same.

In addition, an object of the present invention is to provide a power generator that can continuously provide power by controlling the springs of a plurality of mainspring modules to be sequentially unwound, and a fluid supply device having the same.

The problems of the present invention are not limited to the problems mentioned above, and other problems that are not mentioned will be clearly understood by those skilled in the art from the description below.

Technical Solution

According to one aspect of the present invention, provided is a power generator, including a first outer case in which a first internal space is formed; a first mainspring module which has a first spring that provides a rotational force as it is wound and unwound by rotation; a first inner case which covers the first mainspring module and rotates in a rotational direction about a rotation axis according to the rotational force provided by the first spring; a second outer case in which a second internal space is formed and which is disposed on one direction side of the first outer case; a second mainspring module which has a second spring that provides a rotational force as it is wound and unwound by rotation; a second inner case which covers the second mainspring module and rotates in the rotation direction about the rotation axis according to the rotational force provided by the second spring; and a first holder module which is coupled to the first outer case to limit the unwinding of the first spring until the unwinding of the second spring is completed.

In this case, the first mainspring module may be connected to the first spring and rotates by the rotational force provided by the first spring, and further include a first escapement having a plurality of teeth formed at predetermined intervals along a periphery, and the first holder module can limit rotation of the first escapement.

In this case, the first mainspring module may further include a first mainspring housing in which the first spring and the first escapement are disposed and which is disposed in the first internal space.

In this case, the first mainspring module may further include a first escapement machine which is coupled between the first spring and the first escapement to rotate the first escapement at a predetermined rotation speed.

In this case, the first holder module may include a first holder whose one end extends to be positioned between a plurality of teeth of the first escapement, and the first inner case may have a first inner case opening which is formed to provide a space such that the first holder can be positioned between the teeth of the first escapement.

In this case, the first holder may include a pair of first fixing protrusions which respectively protrude in the one direction and in an opposite direction of the one direction, the first outer case may have a first seating groove which is formed on one side, and the first holder module may further include a first holder case which is seated in the first seating groove and is formed with a fixing hole into which the first fixing protrusion can be inserted, and a first holder cover which is coupled to the first holder case with the first holder in the center and is formed with a fixing hole into which the first fixing protrusion can be inserted.

In this case, the first outer case may further include a pair of first guide grooves which extend in the one direction on a rotation direction side of the first seating groove and on an opposite direction side of the rotation direction, and the first holder case may further include a first guide rail which is inserted into the first guide groove on the rotation direction side of the first seating groove and on the opposite direction side of the rotation direction.

In this case, the first holder case may have a first holder case opening which is formed to provide a space in which the first holder is placed, and the first holder cover may have a pair of first depressions which are formed such that the rotation direction side of the first holder case opening and the opposite direction side of the rotation direction can be inserted.

In this case, the first holder case may be formed such that the thickness becomes thinner as the ends of the rotation direction side of the first holder case opening and the opposite direction side of the rotation direction approach each other.

In this case, the other end of the first holder may extend, and the first holder module may further include a first elastic body which is disposed on the opposite direction side of the rotation direction of the other end of the first holder and elastically deformed by the other end of the first holder as the first holder pivots.

In this case, the first holder module may further include a second elastic body which is disposed on the rotation direction side of the other end of the first holder and elastically deformed by the other end of the first holder as the first holder pivots.

In this case, the first holder may further have a pair of first guide protrusions at the other end which respectively protrude in the one direction and the opposite direction of the one direction, the first holder case may have a first holder case slot into which the first guide protrusion is inserted and which extends to guide the holder as the first holder rotates the first fixing protrusion about a rotation axis, and the first holder cover may have a first holder cover slot into which the first guide protrusion is inserted and which extends to guide the holder as the first holder rotates the first fixing protrusion about a rotation axis.

In this case, the first holder case may be formed integrally with the first outer case.

In this case, the second inner case may include a first bar which protrudes from an outer surface of the second inner case to a space between the first inner case and the first outer case, and the first bar may press one end of the first holder as the second inner case rotates in the rotation direction by the second mainspring module such that one end of the first holder is separated from between a plurality of teeth of the first escapement.

In this case, the first inner case may have a first stopper which protrudes toward the second inner case, the second inner case may have a second stopper which protrudes toward the first inner case, and the second spring may be in an unwound state while an end of the second stopper on the opposite direction side of the rotation direction is in contact with an end of the first stopper on the rotation direction side, and be in a wound state while an end of the second stopper on the rotation direction side is in contact with an end of the first stopper on the opposite direction side of the rotation direction.

In this case, the first bar may be positioned on the rotation direction side of the first holder in the wound state, and rotate around the rotation axis as the second spring is unwound to separate the first holder from the teeth of the first escapement such that the first spring is unwound so as to be positioned on the opposite direction side of the rotation direction of the first holder in the wound state.

In this case, the power generator may further include a third outer case in which a third internal space is formed and which is disposed between the second outer case and the first outer case; a third mainspring module which has a third spring that provides a rotational force by winding and unwinding by rotation, and a third escapement which is connected to the first spring, rotates by the rotational force provided by the first spring and has a plurality of teeth formed at predetermined intervals along a periphery; a third inner case which covers the third mainspring module and rotates in the rotation direction about the rotation axis according to the rotational force provided by the third spring; and a third holder module which has a third holder that extends such that one end can be positioned between a plurality of teeth of the third escapement to limit the unwinding of the third spring until the unwinding of the third spring is completed, and is coupled to the third outer case, wherein the third inner case has a first inner case opening which provides a space such that the first holder can be positioned between the teeth of the first escapement.

In this case, the second inner case may have a first bar which protrudes from an outer surface of the second inner case to a space between the third inner case and the third outer case, the third inner case may have a second bar which protrudes from an outer surface of the third inner case to a space between the first inner case and the first outer case, the first bar may press one side of one end of the third holder as the second inner case rotates in the rotation direction by the second mainspring module such that one end of the third holder is separated from between a plurality of teeth of the third escapement, and the second bar may press one side of one end of the first holder as the third inner case rotates in the rotation direction by the third mainspring module such that one end of the first holder is separated from between a plurality of teeth of the first escapement.

Meanwhile, according to another aspect of the present invention, provided is a fluid supply device having a power generator, including: the above-described power generator; a housing in which the power generator is fixed on one side; an injector including a piston which is fixed to the housing and a syringe which is coupled to the piston; a main gear which is positioned on the one direction side of the second inner case of the power generator and rotates together with the second inner case; and a rack gear which is coupled to the main gear and translates the syringe through a rotational force generated by the power generator.

In this case, the fluid supply device may further include at least one leg block which is provided to be able to be coupled to the other side of the housing so as to have the same height as the height of the power generator in the one direction.

Advantageous Effects

The power generator according to an exemplary embodiment of the present invention and the fluid supply device having the same can continuously provide power for a certain period of time even in the absence of power supply by using elastic energy stored in the mainspring module.

In addition, the power generator according to an exemplary embodiment of the present invention and the fluid supply device having the same have a structure that can connect a plurality of mainspring modules in series, thereby controlling the time for providing power as needed.

In addition, the power generator according to an exemplary embodiment of the present invention and the fluid supply device having the same are provided with a holder module which is capable of limiting the unwinding of the springs of a plurality of mainspring modules such that the springs of the plurality of mainspring modules can be unwound sequentially, thereby continuously providing power.

The effects of the present invention are not limited to the effects described above, and it should be understood to include all effects that can be inferred from the configuration of the invention described in the description of the present invention or claims.

MODES OF THE INVENTION

Figure 1:
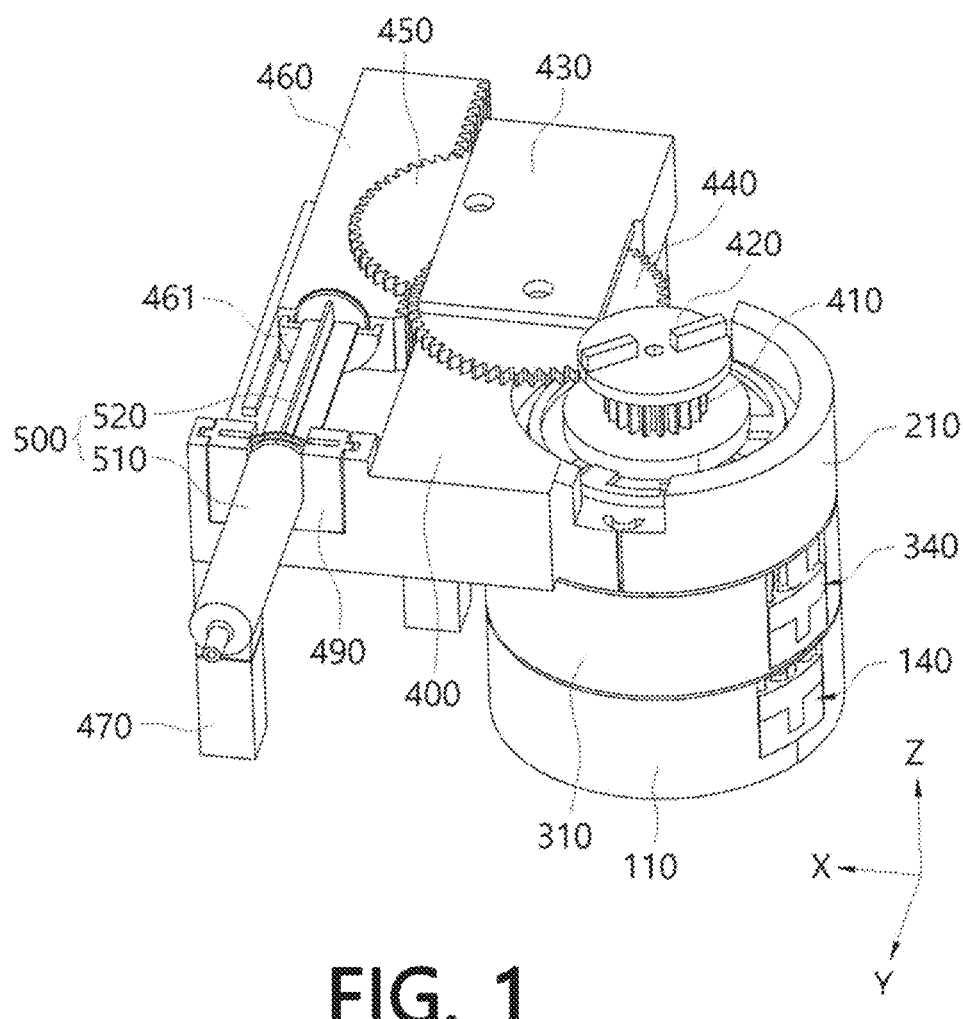
FIG. 1 is a perspective view of the fluid supply device having a power generator according to an exemplary embodiment of the present invention.

Hereinafter, with reference to the accompanying drawings, the exemplary embodiments of the present invention will be described in detail so that those skilled in the art can easily practice the present invention. The present invention may be embodied in many different forms and is not limited to the exemplary embodiments described herein. In order to clearly describe the present invention, parts that are irrelevant to the description are omitted in the drawings, and the same reference numerals are assigned to the same or similar components throughout the specification.

Words and terms used in the present specification and claims are not construed as limited in their ordinary or dictionary meanings, but in accordance with the principle that the inventors can define terms and concepts in order to best describe their inventions, they must be interpreted as meanings and concepts that correspond to the technical ideas of the present invention.

Therefore, the exemplary embodiments described in the present specification and the configurations illustrated in the drawings correspond to a preferred exemplary embodiment of the present invention, and do not represent all the technical ideas of the present invention, and thus, there may be equivalents and variations for the corresponding configurations that may replace the same at the time of filing of the present invention.

It should be understood that the terms "include" or "have", when used in the present specification, are intended to describe the presence of stated features, integers, steps, operations, elements, components and/or a combination thereof, but not preclude the possibility of the presence or addition of one or more other features, integers, steps, operations, elements, components or a combination thereof.

The presence of an element in/on "front", "rear", "upper or above or top" or "lower or below or bottom" of another element includes not only being disposed in/on "front", "rear", "upper or above or top" or "lower or below or bottom" directly in contact with other elements, but also cases in which another element being disposed in the middle, unless otherwise specified. In addition, unless otherwise specified, that an element is "connected" to another element includes not only direct connection to each other but also indirect connection to each other.

Hereinafter, the power generator according to an exemplary embodiment of the present invention and the fluid supply device having the same will be described with reference to the drawings.

Figure 2:
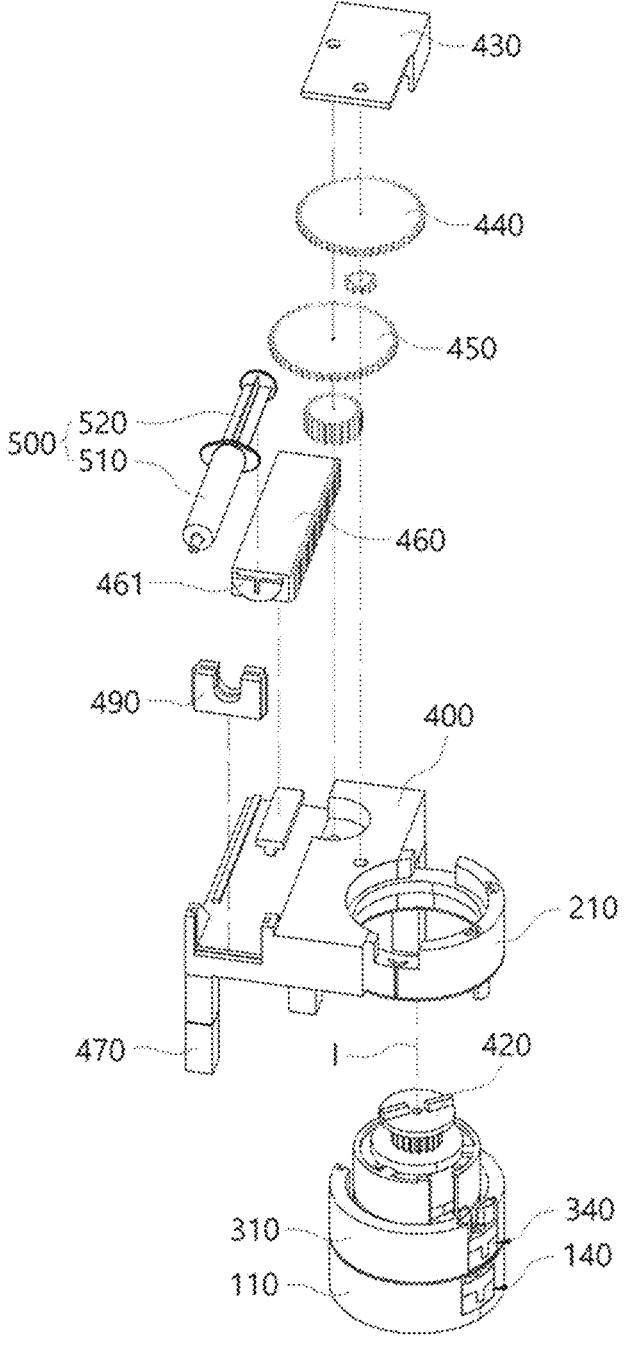
FIG. 2 is an exploded perspective view of the fluid supply device having a power generator according to an exemplary embodiment of the present invention.
Figure 3:
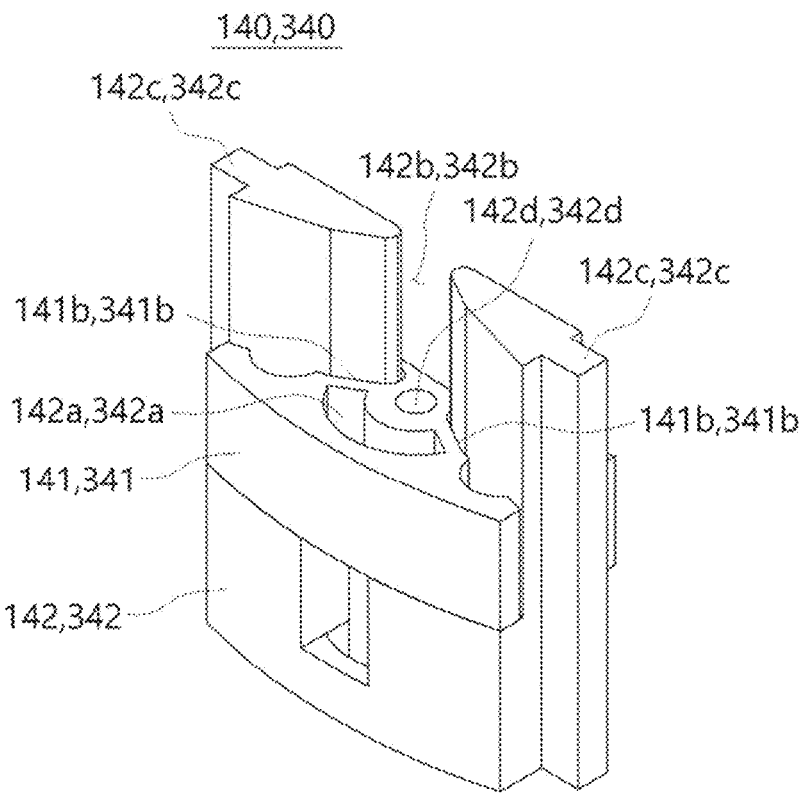
FIG. 3 is a perspective view of a holder module of the fluid supply device having a power generator according to an exemplary embodiment of the present invention.
Figure 4:
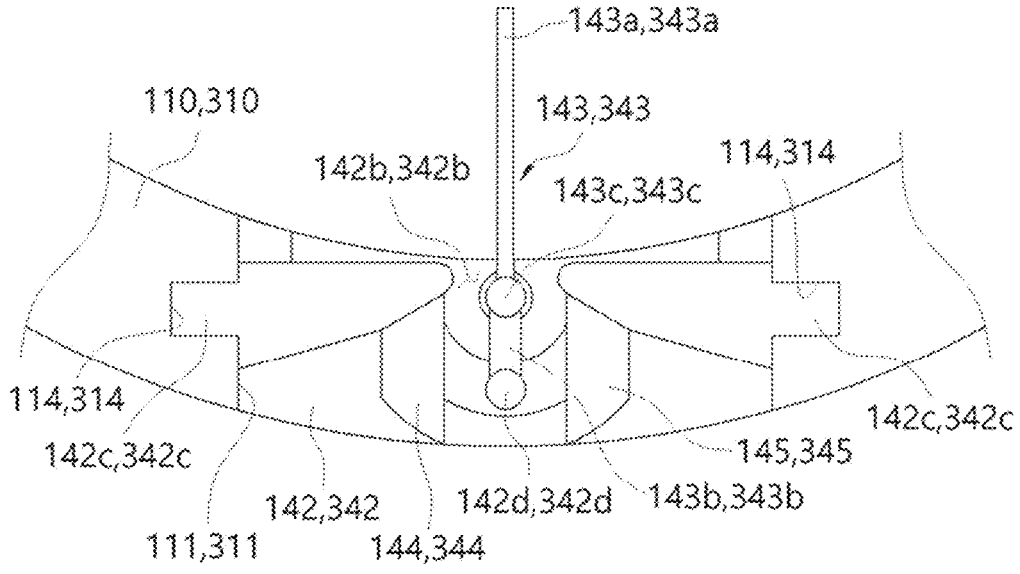
FIG. 4 is a top view of the holder module with a holder cover removed in the fluid supply device having a power generator according to an exemplary embodiment of the present invention.
Figure 5:
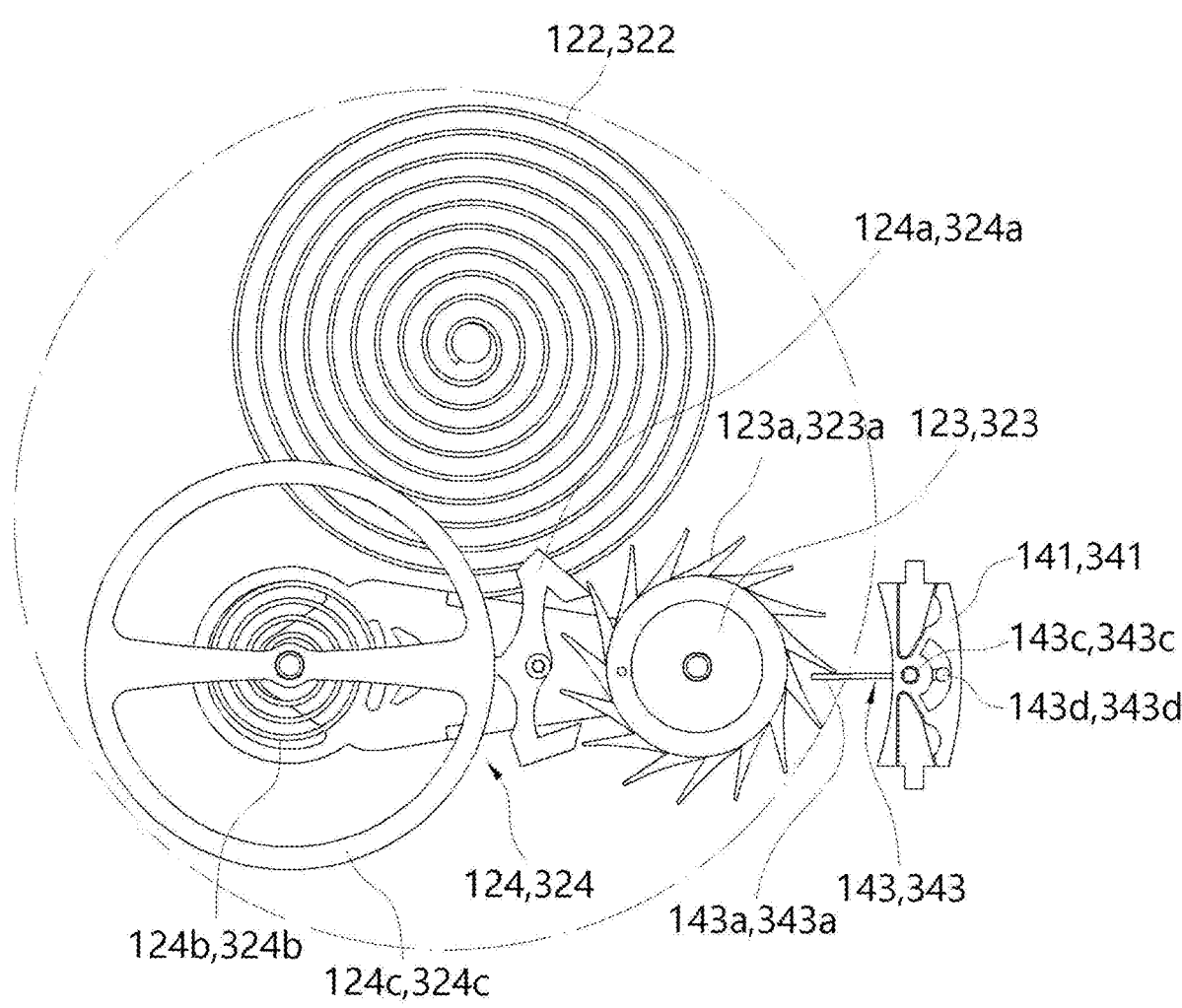
FIG. 5 is a top view schematically illustrating a mainspring module of the fluid supply device having a power generator according to an exemplary embodiment of the present invention.
Figure 6:
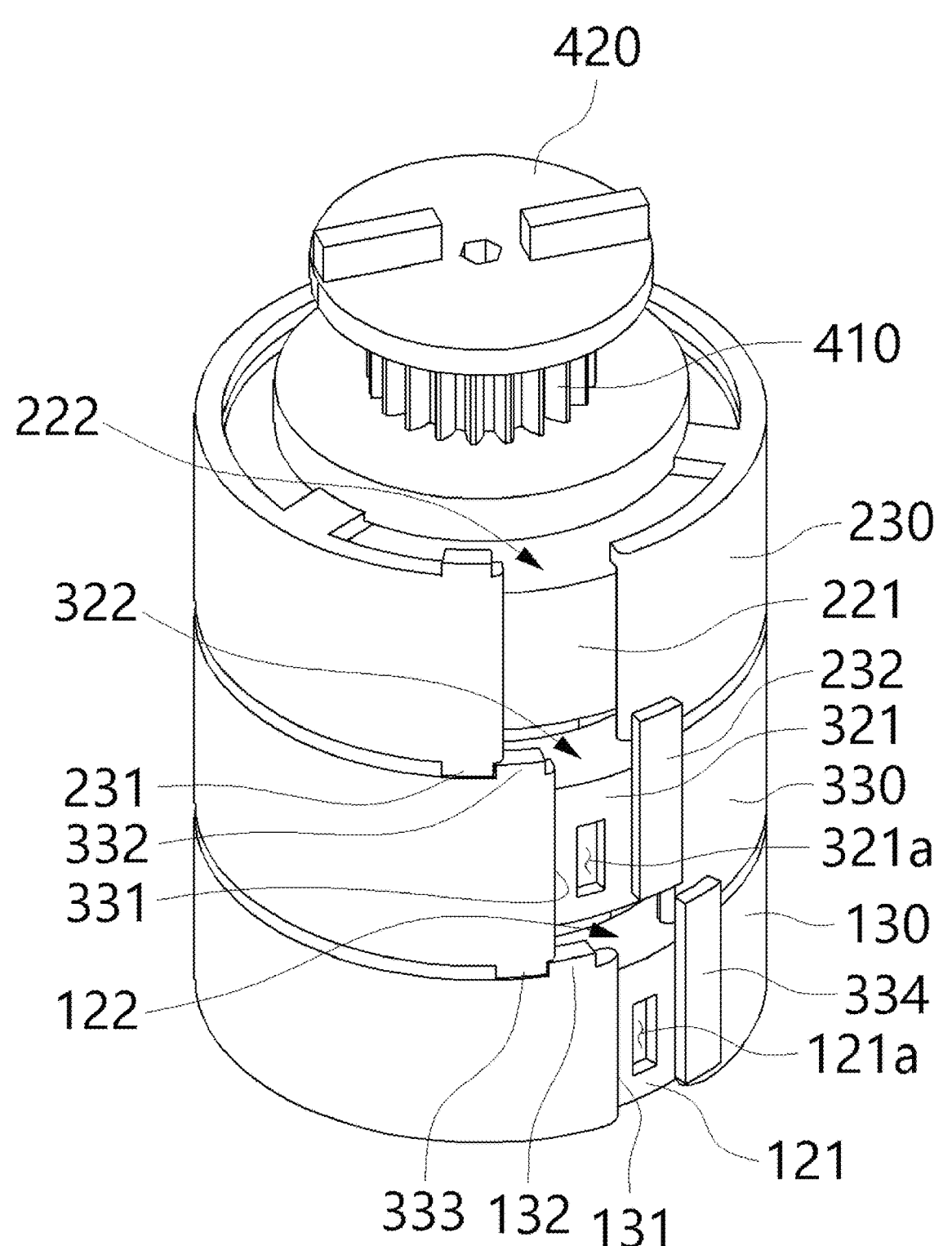
FIG. 6 is a perspective view of a second inner case, a third inner case and a first inner case of the fluid supply device having a power generator according to an exemplary embodiment of the present invention.

FIG. 1 is a perspective view of the fluid supply device having a power generator according to an exemplary embodiment of the present invention. FIG. 2 is an exploded perspective view of the fluid supply device having a power generator according to an exemplary embodiment of the present invention. FIG. 3 is a perspective view of a holder module of the fluid supply device having a power generator according to an exemplary embodiment of the present invention. FIG. 4 is a top view of the holder module with a holder cover removed in the fluid supply device having a power generator according to an exemplary embodiment of the present invention. FIG. 5 is a top view schematically illustrating a mainspring module of the fluid supply device having a power generator according to an exemplary embodiment of the present invention. FIG. 6 is a perspective view of a second inner case, a third inner case and a first inner case of the fluid supply device having a power generator according to an exemplary embodiment of the present invention. In this case, the direction in which the Z-axis illustrated in FIG. 1 faces is defined as upward.

As illustrated in FIG. 1, the fluid supply device 1 having a power generator according to an exemplary embodiment of the present invention includes a power generator, a housing 400 and an injector 500. Hereinafter, the power generator will first be described in detail.

The power generator includes a first outer case 110, a first mainspring module 120, a first inner case 130, a second outer case 210, a second mainspring module 220, a second inner case 230 and a first holder module 140.

As illustrated in FIG. 1, the first outer case 110 has a cylindrical first internal space formed therein. The external shape of the first outer case 110 is not limited. In the present exemplary embodiment, it is formed in a cylindrical enclosure shape with a predetermined thickness.

A bottom surface may be formed in the lower part of the first outer case 110. It is possible to prevent foreign substances from entering the first internal space of the first outer case 110. However, if the first mainspring module 120, which will be described below, can be fixed, the bottom surface of the first outer case 110 does not necessarily have to be formed.

As illustrated in FIG. 2, the second outer case 210 is coupled to the upper part of the first outer case 110. The external shape of the second outer case 210 is not limited as long as it can be combined with the first outer case 110. Various known methods may be applied to the structure in which the first outer case 110 and the second outer case 210 are coupled. For example, it may be a structure in which protrusions are inserted and fixed, or it may be bonded by using an adhesive.

A second internal space is formed inside the second outer case 210. The second internal space is opened downward and is connected to the first internal space of the first outer case 110. Accordingly, the second internal space and the first internal space may form a single space.

The upper side of the second outer case 210 is open. This is so that the handle 420 formed on the upper side of the second inner case 230 disposed in the second internal space is exposed to the outside. By combining the housing 400, which will be described below, with the second outer case 210, only the handle 420 is exposed to the outside, and the second internal space of the second outer case 210 may be prevented from being exposed to the outside.

Meanwhile, a third outer case 310 may be further coupled between the second outer case 210 and the first outer case 110. Like the second outer case 210 and the first outer case 110, a third internal space is formed in the third outer case 310.

When the third outer case 310 is additionally provided, the second internal space, the third internal space and the first internal space are arranged sequentially from the upper side to the lower side. The second internal space, the third internal space and the first internal space extend in the vertical direction to form a single space.

In the following description of the exemplary embodiment, the description will be provided with the third outer case 310 added. However, the third outer case 310 is not necessarily present, and only the second outer case 210 and the first outer case 110 may be combined if necessary.

As illustrated in FIGS. 2 and 6, the first mainspring module 120 is disposed inside the first outer case 110. The lower end of the first spring module 120 is coupled to the first outer case 110, and the upper end is coupled to the first inner case 130.

To this end, the first mainspring module 120 has a first mainspring housing 121 which is disposed in the first internal space such that the first spring 122 is fixed therein. The first mainspring housing 121 is formed in a cylindrical shape such that one side can be rotated while being disposed in the first internal space of the first outer case 110. That is, the first mainspring housing 121 may be separated into upper and lower ends, and the upper and lower ends are formed to rotate relative to each other.

In this case, the first mainspring housing 121 has a first spring 122 inside which provides a rotational force as it is wound and unwound by rotation. One side of the first spring 122 is fixed to the upper end of the first mainspring housing 121, and the other side is fixed to the lower end of the first mainspring housing 121.

Accordingly, the first spring 122 provides a rotational force to the upper part of the first mainspring housing 121 while the lower end of the first mainspring housing 121 is fixed to the first outer case 110, thereby rotating the upper end of the first mainspring housing 121 and the first inner case 130 fixed thereto.

As for the first spring 122, any known component may be used as long as it can provide a rotational force to rotate the upper and lower ends of the first mainspring housing 121 in opposite directions. For example, it may be a spiral spring.

As illustrated in FIG. 5, the first mainspring module 120 has a first escapement 123 connected to the first spring 122 and rotates by the rotational force provided by the first spring 122 and having a plurality of teeth 123a formed at predetermined intervals along a periphery. That is, the first escapement 123 is coupled in series between the first spring 122 and the first mainspring housing 121. Accordingly, when the rotation of the first escapement 123 stops, the unwinding of the first spring 122 is prevented, and the rotation of a significant part of the first mainspring housing 121 also stops.

In addition, as illustrated in FIG. 5, the first mainspring module 120 has a first escapement machine 124 which is coupled between the first spring 122 and the first escapement 123 to rotate the first escapement 123 at a predetermined rotation speed.

As long as the first escapement machine 124 can regulate the rotational speed of the first escapement 123, any known mechanism can be used. For example, the escapement mechanism used in mechanical watches may be used.

In the present exemplary embodiment, as illustrated in FIG. 5, the first escapement machine 124 includes at least one first connection gear (not illustrated) which is connected between a first barrel (not illustrated), which rotates by the unwinding of the first spring 122, and the first escapement 123, a first lever 124a which controls the rotation speed of the first escapement 123, and a first balance wheel 124c which repeats rotation within a certain angle range by transmitting a rotational force of the first lever 124a and returning by the elasticity of the first hairspring 124b after rotation.

Accordingly, when the first barrel (not illustrated) rotates due to the unwinding of the first spring 122, the rotation and return of the first balance wheel 124c is repeated, and accordingly, as the first lever 124a reciprocates and rotates within a certain angle, the first spring 122 is unwound at a constant speed, and thus, a rotational force may be provided continuously for a certain period of time by unwinding the first spring 122.

In this case, although not illustrated in the drawings, a protrusion is formed on the first balance wheel 124c, and the first balance wheel 124c sequentially presses both sides of one end of the first lever 124a in a repeated process due to the elasticity of the first hairspring 124b such that the first lever 124a can rotate back and forth within a certain angle. Two arms are formed on the other side of the first lever 124a, and the two arms alternately press the teeth of the first escapement 123 in the rotation direction or prevent rotation, thereby constantly controlling the rotation speed of the first escapement 123.

As illustrated in FIG. 6, a first inner case 130 is disposed outside the first mainspring module 120. That is, the first inner case 130 is disposed between the first outer case 110 and the first spring module 120.

The first inner case 130 covers the first mainspring module 120 and rotates about a rotation axis (I) in a rotation direction, that is, counterclockwise, according to the rotational force provided by the first spring 122. To this end, the first inner case 130 is fixed to the upper end of the first mainspring housing 121. That is, the lower end of the first mainspring housing 121 is fixed to the first outer case 110, and the first inner case 130 is fixed to the upper end of the first mainspring housing 121 so as to rotate in the internal space of the first outer case 110 due to the rotational force of the first spring 122.

In this case, as illustrated in FIG. 6, the first inner case 130 has a first inner case opening 131 which provides a space such that the first holder 143, which will be described below, can be positioned between the teeth 123a of the first escapement. The first inner case opening 131 may be formed by cutting a part of the first inner case 130. Accordingly, one side of the first mainspring housing 121 is exposed through the first inner case opening 131.

In this case, as illustrated in FIG. 6, a first mainspring housing opening 121a is disposed on the first inner case opening 131 side. The inside of the first mainspring housing 121 is exposed through the first mainspring housing opening 121a as the first inner case opening 131.

The first mainspring housing opening 121a is formed on the first escapement 123 side of the first mainspring module 120. Accordingly, the first escapement 123 can be seen through the first mainspring housing opening 121a. In this case, a first holder module 140 is provided to control the rotation of the first escapement 123 through the first mainspring housing opening 121a and the first inner case opening 131, and this will be described below.

As illustrated in FIG. 6, the first inner case 130 has a first stopper 132. The first stopper 132 is formed to protrude from an upper part on one side of the first inner case opening 131. The first stopper 132 has a protrusion shape protruding upward and is formed integrally with the first inner case 130.

The first stopper 132 is formed such that no steps are formed on the outer surfaces of the first stopper 132 and the first inner case 130. Accordingly, it is possible to prevent the first stopper 132 from interfering with rotation when the first stopper 132 rotates together with the first inner case 130 inside the first outer case 110.

The first stopper 132 has a support surface formed on a rotation direction side of the first inner case 130 and on an opposite direction side of the rotation direction. A second stopper 231, which will be described below, comes into contact with the support surface formed on the first stopper 132. This will be described below.

As illustrated in FIGS. 2 and 6, the third mainspring module 320 is disposed inside the third outer case 310. In this case, the third mainspring module 320 is the same mainspring module as the first mainspring module 120, and has a different name depending on the position where it is placed. The third mainspring module 320 has a lower end coupled to the first inner case 130 and an upper end coupled to the third inner case 330.

The third mainspring module 320 has a third mainspring housing 321 which is disposed in a third internal space formed inside the third outer case 310 such that the third spring 322 is fixed therein. The third mainspring housing 321 is formed in a cylindrical shape such that one side can be rotated while being disposed in the third internal space. That is, like the first mainspring housing 121, the third mainspring housing 321 may be separated into upper and lower ends, and the upper and lower ends are formed to rotate relative to each other.

In this case, the third mainspring housing 321 has a third spring 322 therein which provides a rotational force as it is wound and unwound by rotation. One side of the third spring 322 is fixed to the upper end of the third mainspring housing 321, and the other side is fixed to the lower end of the third mainspring housing 321.

Accordingly, as the third spring 322 provides a rotational force to the upper end of the third mainspring housing 321 while the lower end of the third mainspring housing 321 is fixed to the first inner case 130, it rotates the upper end of the third mainspring housing 321 and the third inner case 330 fixed thereto.

As for the third spring 322, any known component may be used as long as it can provide a rotational force to rotate the upper and lower ends of the third mainspring housing 321 in opposite directions. For example, it may be a spiral spring.

As illustrated in FIG. 5, the third mainspring module 320, like the first mainspring module 120, has a third escapement 323 and a third escapement machine 324. In addition, the third escapement machine 324 includes a third barrel (not illustrated), at least one third connection gear (not illustrated), a third lever 324a, a third hairspring 324b and a third balance wheel 324c. In this case, the descriptions of the third escapement 323, the third barrel (not illustrated) of the third escapement machine 324, at least one third connection gear (not illustrated), the third lever 324a, the third hair spring 324b and the third balance wheel 324c are replaced by the descriptions of the above-described first escapement 123 of the first mainspring module 120, the first barrel (not illustrated) of the first escapement machine 124, at least one first connection gear (not illustrated), the first lever 124a, the first hairspring 124b and the first balance wheel 124c.

As illustrated in FIG. 6, a third inner case 330 is disposed outside the third mainspring module 320. That is, the third inner case 330 is disposed between the third outer case 310 and the third mainspring module 320.

The third inner case 330 covers the third mainspring module 320 and rotates about a rotation axis (I) in a rotation direction, that is, counterclockwise, according to the rotational force provided by the third spring 322. To this end, the third inner case 330 is fixed to the upper end of the third mainspring housing 321. The lower end of the third mainspring housing 321 is fixed to the upper surface of the first inner case 130, and the third inner case 330 is fixed to the upper end of the third mainspring housing 321 so as to rotate in the internal space of the third outer case 310 by the rotational force of the third spring 322.

In this case, as illustrated in FIG. 6, the third inner case 330 has a third inner case opening 331 which provides a space such that the third holder 343, which will be described below, can be positioned between the teeth 323a of the third escapement. The third inner case opening 331 may be formed by cutting a part of the third inner case 330. Accordingly, one side of the third mainspring housing 321 is exposed through the third inner case opening 331.

In this case, as illustrated in FIG. 6, the third mainspring housing opening 321a is disposed on the third inner case opening 331 side. The inside of the third mainspring housing 321 is exposed through the third mainspring housing opening 321a to the third inner case opening 331.

The third mainspring housing opening 321a is formed on the third escapement 323 side of the third mainspring module 320. Accordingly, the third escapement 323 can be seen through the third mainspring housing opening 321a. In this case, a third holder module 340 is provided to control the rotation of the third escapement 323 through the third mainspring housing opening 321a and the third inner case opening 331, which will be described below.

As illustrated in FIG. 6, the third inner case 330 has a third stopper 332. The third stopper 332 is formed to protrude from an upper part of one side of the third inner case opening 331. The third stopper 332 has a protrusion shape which protrudes upward and is formed integrally with the third inner case 330.

The third stopper 332 is formed such that no step is formed on the outer surfaces of the third stopper 332 and the third inner case 330. Accordingly, it is possible to prevent the third stopper 332 from interfering with rotation when the third stopper 332 rotates together with the third inner case 330 inside the third outer case 310.

The third stopper 332 has a support surface formed on a rotation direction side of the third inner case 330 and on an opposite direction side of the rotation direction. A second stopper 231, which will be described below, comes into contact with a support surface formed on the third stopper 332. This will be described below while explaining the operation of the present invention.

As illustrated in FIG. 6, the third inner case 330 has a fourth stopper 333. The fourth stopper 333 is disposed to be opposite to the third stopper 332 with the third inner case 330 in the center. That is, the fourth stopper 333 is formed to protrude from the lower part of one side of the third inner case opening 331. The fourth stopper 333 has a protrusion shape which protrudes downward and may be formed integrally with the third inner case 330.

The fourth stopper 333 is formed such that no step is formed on the outer surfaces of the fourth stopper 333 and the third inner case 330. Accordingly, it is possible to prevent the fourth stopper 333 from interfering with rotation when the fourth stopper 333 rotates together with the third inner case 330 inside the third outer case 310.

The fourth stopper 333 has a support surface formed on a rotation direction side of the third inner case 330 and on an opposite direction side of the rotation direction. The above-described first stopper 132 comes into contact with a support surface formed on the fourth stopper 333. This will be described below while explaining the operation of the present invention.

As illustrated in FIGS. 2 and 6, the second mainspring module 220 is disposed inside the second outer case 210. The second mainspring module 220 has a lower end which is coupled to the third inner case 330 and an upper end which is coupled to the second inner case 230.

The second mainspring module 220 has a second mainspring housing 221 which is disposed in a second internal space formed inside the second outer case 210 such that the second spring 222 is fixed therein. The second mainspring housing 221 is formed in a cylindrical shape such that one side can be rotated while being disposed in the second internal space. That is, like the first mainspring housing 121 and the third mainspring housing 321, the second mainspring housing 221 may be separated into upper end and lower ends, and the upper and lower ends are formed to rotate relative to each other.

In this case, the second mainspring housing 221 has a second spring 222 therein which provides a rotational force as it is wound and unwound by rotation. One side of the second spring 222 is fixed to the upper end of the second mainspring housing 221, and the other side is fixed to the lower end of the second mainspring housing 221.

Accordingly, as the second spring 222 provides a rotational force to the upper end of the second mainspring housing 221 while the lower end of the second mainspring housing 221 is fixed to the first inner case 130, it rotates the upper end of the second mainspring housing 221 and the second inner case 230 fixed thereto.

As for the second spring 222, any known component may be used as long as it can provide a rotational force to rotate the upper and lower ends of the second mainspring housing 221 in opposite directions. For example, it may be a spiral spring.

As illustrated in FIG. 5, the second mainspring module 220, like the first mainspring module 120, includes a second escapement (not illustrated) and a second escapement machine (not illustrated). In addition, the second escapement machine (not illustrated) includes a second barrel (not illustrated), at least one second connection gear (not illustrated), a second lever (not illustrated), a second hairspring (not illustrated) and a second balance wheel (not illustrated). In this case, the descriptions of the second escapement, the second barrel of the second escapement machine, at least one second connection gear, the second lever, the second hairspring and the second balance wheel are replaced by the descriptions of the above-described first escapement 123 of the first mainspring module 120, the first barrel (not illustrated) of the first escapement machine 124, at least one first connection gear (not illustrated), the first lever 124a, the first hairspring 124b and the first balance wheel 124c.

As illustrated in FIG. 6, a second inner case 230 is disposed outside the second mainspring module 220. That is, the second inner case 230 is disposed between the second outer case 210 and the second winding module 220.

The second inner case 230 covers the second mainspring module 220 and rotates about a rotation axis (I) in a rotation direction, that is, counterclockwise, according to the rotational force provided by the second spring 222. To this end, the second inner case 230 is fixed to the upper end of the second mainspring housing 221. The lower end of the second mainspring housing 221 is fixed to the upper surface of the third inner case 330, and the second inner case 230 is fixed to the upper end of the second mainspring housing 221 to rotate in the internal space of the second outer case 210 by the rotation force of the second spring 222.

However, in the present exemplary embodiment, it is explained that the third outer case 310, the third inner case 330 and the third mainspring module 320 are provided, but in other exemplary embodiments, the third outer case 310, the third inner case 330 and the third mainspring module 320 may be excluded. In this case, the lower end of the second mainspring housing 221 may be fixed to the upper surface of the first inner case 130.

As illustrated in FIG. 6, the second inner case 230 has a second stopper 231. The second stopper 231 is formed in the lower part of the second inner case 230. That is, the second stopper 231 has a protrusion shape which protrudes downward and is formed integrally with the second inner case 230.

Unlike the third inner case 330 and the first inner case 130, the second inner case 230 may not be provided with the third inner case opening 331 and the first inner case opening 131.

The second stopper 231 is formed such that no step is formed on the outer surfaces of the second stopper 231 and the second inner case 230. Accordingly, it is possible to prevent the second stopper 231 from interfering with rotation when the second stopper 231 rotates together with the second inner case 230 inside the second outer case 210.

The second stopper 231 has a support surface formed on a rotation direction side of the second inner case 230 and on an opposite direction side of the rotation direction. The third stopper 332 described above comes into contact with a support surface formed on the second stopper 231. This will be described below while explaining the operation of the present invention.

As illustrated in FIG. 6, the second inner case 230 has a first bar 232 which extends downward and is spaced apart in a counterclockwise direction from the second stopper 231 of the second inner case 230. In this case, the first bar 232 protrudes downward from the outer surface of the second inner case 230. Accordingly, the first bar 232 is disposed outside the third inner case 330.

The first bar 232 does not extend lower than the third inner case 330. Accordingly, the first bar 232 is disposed between the third inner case 330 and the third outer case 310. The first bar 232 rotates in a counterclockwise direction between the third inner case 330 and the third outer case 310 as the second inner case 230 rotates by the second mainspring module 220, or rotates in a clockwise direction between the third inner case 330 and the third outer case 310 as the user rotates the second inner case 230 in a clockwise direction. In this case, the first bar 232 may press one end 343a of the third holder, which will be described below, to one side or the other side.

Meanwhile, in the present exemplary embodiment, it is explained that the third outer case 310, the third inner case 330 and the third mainspring module 320 are provided, but in other exemplary embodiments, the third outer case 310, the third inner case 330 and the third mainspring module 320 may be excluded. In this case, the above-described first stopper 132 may contact a support surface formed on the second stopper 231.

As illustrated in FIG. 6, the third inner case 330 has a second bar 334 which extends downward and is spaced apart in a counterclockwise direction from the fourth stopper 333 of the third inner case 330. That is, the fourth stopper 333 is formed at the clockwise direction side end of the third inner case opening 331, and the second bar 334 is formed at the counterclockwise direction side end of the third inner case opening 331. In this case, the second bar 334 protrudes downward from the outer surface of the third inner case 330. Accordingly, the second bar 334 is disposed outside the third inner case 330.

The second bar 334 does not extend lower than the first inner case 130. Accordingly, the second bar 334 is disposed between the first inner case 130 and the first outer case 110. The second bar 334 rotates in a counterclockwise direction between the first inner case 130 and the first outer case 110 as the third inner case 330 rotates by the third mainspring module 320, or rotates in a clockwise direction between the first inner case 130 and the first outer case 110 along the third inner case 330, which rotates together, as the user rotates the second inner case 230 in a clockwise direction. In this case, the second bar 334 may press one end 143a of the first holder, which will be described below, to one side or the other side.

Hereinafter, the first holder module 140 and the third holder module 340, which are provided such that the above-described first mainspring module 120, the third mainspring module 320 and the second mainspring module 220 can operate sequentially, will be described.

As illustrated in FIGS. 1 and 2, the first holder module 140 is coupled to the first outer case 110. The first holder module 140 is coupled to the first outer case 110 by being seated in the first seating groove 111 formed on one side of the first outer case 110.

The first seating groove 111 is a groove which is formed in a part of the first outer case 110, and it may be formed to be depressed from the top to the bottom. In this case, in order to easily couple the first holder module 140 to the first outer case 110, the first holder module 140 includes a first holder case 142 and a first holder cover 141.

The first holder case 142 is seated in the first seating groove 111. In this case, as illustrated in FIG. 4, while the first holder case 142 is seated in the first seating groove 111, the first outer case 110 forms a cylinder together with first holder case 142.

As illustrated in FIG. 3, a pair of first guide rails 142c which extend in the vertical direction are formed at both peripheral direction ends of the first outer case 110 of the first holder case 142. In order to correspond thereto, a pair of first guide grooves 114 which extend upward and downward are formed in the first seating groove 111 at both peripheral direction ends of the first outer case 110.

Accordingly, as illustrated in FIG. 4, the first holder case 142 may be seated while moving downward in the first seating groove 111 along the first guide groove 114. However, the above-described method of coupling the first holder case 142 to the first seating groove 111 is only an example, and the first holder case 142 may be coupled to the first seating groove 111 through various known structures.

As illustrated in FIG. 3, a first holder case opening 142b which extends in the vertical direction is formed in the first holder case 142. As the first holder case opening 142b is formed, the first holder case 142 is formed in a 'U' shape that opens upward.

The inside and outside of the first outer case 110 may pass through the first holder case opening 142b. The first holder case 142 may be formed to have a thickness in the radial direction that becomes smaller toward a part where the first holder case opening 142b is formed. In addition, the first outer case 110 may be formed in a shape in which the rate at which the thickness decreases in the radial direction along the peripheral direction changes.

As illustrated in FIG. 4, a fixing hole 142d of the first holder case penetrating in the vertical direction is formed on the lower side of the first holder case 142 on the opposite side of the side where the first holder case opening 142b is formed. The fixing hole 142d of the first holder case is formed in a cylindrical shape. Since the fixing hole 142d of the first holder case is for inserting and rotating the first fixing protrusion 143c, which will be described below, it does not necessarily have to be formed as a hole, and it may also be formed as a groove. However, it is advantageous to be formed to penetrate in the vertical direction in terms of manufacture.

The fixing hole 142d of the first holder case is formed such that the central axis of the fixing hole 142d of the first holder case passes through a plane passing through the center of the first holder case opening 142b in the radial direction of the first outer case 110. In this case, as illustrated in FIG. 4, the fixing hole 142d of the first holder case may be formed to be biased toward the inside of the first outer case 110. Accordingly, a first holder case slot which extends in the peripheral direction by centering on the fixing hole 142d of the first holder case is formed on the outside of the first outer case 110. A first guide protrusion 143d, which will be described below, is inserted into the first holder case slot 142a and moves along the first holder case slot 142a.

The first holder case slot 142a may also be formed to penetrate vertically like the fixing hole 142d of the first holder case. Accordingly, the first holder case 142 may be easily manufactured. However, if the first guide protrusion 143d can be inserted and guided, it may be formed as a groove.

As illustrated in FIG. 3, the first holder cover 141 is coupled to the first holder case 142. The first holder cover 141 is formed with a first depression 141b in which both ends are recessed along the peripheral direction of the first outer case 110.

The first depression 141b is formed to correspond to the shape of a cross-section that is perpendicular to the vertical direction of a part of the first holder case 142 where the first holder case opening 142b is formed. Accordingly, the first holder cover 141 moves along the first holder case opening 142b, and since the inner surface of the first depression 141b of the first holder cover 141 supports the front and rear surfaces of the first holder case 142 that are adjacent to the first holder case opening 142b, the first holder cover 141 is coupled to the first holder case 142.

As illustrated in FIG. 3, in the first holder cover 141, a fixing hole 141d of the first holder cover 141 is formed at a position corresponding to the fixing hole 142d of the first holder case. Like the first holder case 142, a first fixing protrusion 143c, which will be described below, is inserted into the fixing hole 141d of the first holder cover.

Therefore, the fixing hole 141d of the first holder cover and the fixing hole 142d of the first holder case are formed to have the same shape, and their central axes are formed to coincide and face each other.

The fixing hole 141d of the first holder cover may also be formed to penetrate in the vertical direction. Accordingly, the first holder cover 141 may be easily manufactured. However, the fixing hole 141d of the first holder cover does not necessarily have to be formed alone, and it may be formed as a groove if the first fixing protrusion 143c can be inserted and rotated.

As illustrated in FIG. 3, a first holder cover slot 141a is formed in the first holder cover 141 in a shape corresponding to the first holder case slot 142a. That is, the first holder cover slot 141a extends along the peripheral direction around the central axis of the fixing hole 141d of the first holder cover.

Meanwhile, the first holder 143 is disposed between the first holder case 142 and the first holder cover 141. As illustrated in FIG. 4, the first holder 143 extends in length and is formed with a pair of first fixing protrusions 143c protruding from the upper and lower sides. A pair of first fixing protrusions 143c are disposed on the same central axis, and the first fixing protrusion 143c which is formed on the upper side is inserted into the fixing hole 141d of the first holder cover formed in the first holder cover 141, and the first fixing protrusion 143c which is formed on the lower side is inserted into the fixing hole 142d of the first holder case formed in the first holder case 142.

Accordingly, the first holder 143 may pivot and rotate by using the first fixing protrusion 143c as a rotation axis. The first holder 143 extends toward the first internal space of the first outer case 110. In this case, the first holder 143 penetrates a first inner case opening 131 of the first inner case 130 and a first mainspring housing opening 121a of the first mainspring housing 121 to extend such that one end 143a of the first holder can be placed between the teeth 123a of the first escapement.

When this is explained in detail, the first mainspring housing opening 121a, the first inner case opening 131 and the first holder module 140 are arranged along a radial direction from the center of the first outer case 110. Accordingly, while the lengthwise extending first holder 143 is coupled to the first holder case 142 and the first holder cover 141, one end 143a of the first holder may be positioned between the teeth 123a of the first escapement.

By placing the first holder case 142 and the first holder cover 141 to be opposite to each other with the first holder 143 in the center, the first holder 143 may be fixed more stably, and one end 143a of the first holder may be fixed between the first holder case 142 and the first holder cover 141 while being positioned between the teeth 123a of the first escapement.

Accordingly, the first holder module 140 limits the rotation of the first escapement 123 through the first holder 143, thereby limiting the unwinding of the first spring 122. That is, the first holder 143 limits the unwinding of the first spring 122 until the unwinding of the second spring 222 and the third spring 322 is completed.

The other end 143b of the first holder extends toward the outside of the first outer case 110. First guide protrusions 143d which respectively protrude in the vertical direction are formed on the other end 143b of the first holder. The first guide protrusions 143d are inserted into the first holder case slot 142a and the first holder cover slot 141a, respectively, so as to guide the rotation of the first holder 143.

Meanwhile, the first holder case 142 may be formed integrally with the first outer case 110, and the first holder cover 141 may be formed integrally with the first outer case 110. However, in an exemplary embodiment of the present invention, it is described as having a structure that can be separated as described above in order to facilitate the assembly of a power generator.

In this case, as illustrated in FIG. 4, the first holder module 140 has a first elastic body 145 and a second elastic body 144. The first elastic body 145 is disposed on a rotation direction side of the first holder case slot 142a, and the second elastic body 144 is disposed on an opposite direction side of the rotation direction of the first holder case slot 142a. In this case, it will be described by defining the rotation direction as a counterclockwise direction, and defining the end on the rotation direction side of the first holder case slot 142a as one end and the end on the opposite direction side of the rotation direction of the first holder case slot 142a as the other end.

The first elastic body 145 is fixed to the first holder case 142 such that it can be disposed on the upper side of one end of the first holder case slot 142a and the lower side of one end of the first holder cover slot 141a. There are no limitations on the way the first elastic body 145 is fixed.

The first elastic body 145 may be deformed by being pressed by the other end 143b of the first holder 143, when the first holder 143 rotates in a counterclockwise direction. In this case, the first elastic body 145 is formed of an elastically deformable material and has a restoring force to restore its original shape.

Accordingly, when the first holder 143 is rotated in a counterclockwise direction with a force greater than the elastic restoring force of the first elastic body 145, the other end 143b of the first holder deforms the first elastic body 145 such that it is possible to move up to one end of the holder case slot 142a and the first holder cover slot 141a.

On the other hand, when the force for rotating the first holder 143 becomes smaller than the elastic restoring force of the first elastic body 145, the first elastic body 145 presses the other end 143b of the first holder such that the other end 143b of the first holder is positioned at the center of the first holder case slot 142a and the first holder cover slot 141a.

The second elastic body 144 is fixed to the first holder case 142 such that it can be disposed on the upper side of the other end of the first holder case slot 142a and the lower side of the other end of the first holder cover slot 141a. There are also no restrictions in the way the second elastic body 144 is fixed.

The second elastic body 144 may be deformed by being pressed by the other end 143b of the first holder 143 when the first holder 143 rotates in a clockwise direction. In this case, the second elastic body 144 is made of an elastically deformable material and has a restoring force to restore its original shape.

Accordingly, when the first holder 143 is rotated in a clockwise direction with a force greater than the elastic restoring force of the second elastic body 144, the other end 143b of the first holder deforms the second elastic body 144 such that it is possible to move to the other end of the first holder case slot 142a and the first holder cover slot 141a.

On the other hand, when the force for rotating the first holder 143 becomes smaller than the elastic restoring force of the second elastic body 144, the second elastic body 144 presses the other end 143b of the first holder such that the other end 143b of the first holder is positioned at the center of the first holder case slot 142a and the first holder cover slot 141a.

The force for deforming the second elastic body 144 is greater than the restoring force of the first spring 122. That is, while one end 143a of the first holder is disposed between the teeth 123a of the first escapement, even if the teeth 123a of the first escapement press one end 143a of the first holder in a clockwise direction by the first spring 122, it may not deform the second elastic body 144.

Accordingly, one end 143a of the first holder stops while being positioned between the teeth 123a of the first escapement, and the first escapement 123 cannot rotate, thereby restricting the unwinding of the first spring 122.

On the other hand, the force for deforming the first elastic body 145 is smaller than the restoring force of the third spring 322. That is, while one end 143a of the first holder is disposed between the teeth 123a of the first escapement, when the second bar 334, which will be described below, presses the first holder 143 in a counterclockwise direction by the third spring 322, the first elastic body 145 is deformed such that the first holder 143 is separated from between the teeth 123a of the first escapement. Accordingly, since the first escapement 123 can rotate, the unwinding of the first spring 122 begins.

Meanwhile, as illustrated in FIG. 4, the third holder module 340 is coupled to the third outer case 310. In this case, the third holder module 340 is formed identically to the first holder module 140, with the only difference being that it is coupled to the third outer case 310.

Therefore, as the descriptions of the third holder case 342, the third holder cover 341 and the third holder 343 of the third holder module 340, the descriptions of the third holder case slot 342a, the third holder case opening 342b, the third guide rail 342c and the fixing hole 342d of the third holder case 342, the third holder cover slot 341a and the third depression 341b of the third holder cover 341, one end 343a of the third holder 343, the other end 343b of the third fixing protrusion 343c and third guide protrusion 343d will be respectively replaced by the descriptions of the first holder case slot 142a, the first holder case opening 142b, the first guide rail 142c and the fixing hole 142d of the first holder case 142, the first holder cover slot 141a and the first depression 141b of the first holder cover 141, one end 143a of the first holder 143, the other end 143b of the first holder, the first fixing protrusion 143c and the first guide protrusion 143d, as the descriptions of the first holder case 142, first holder cover 141, and first holder 143 of the first holder module 140.

Hereinafter, with reference to FIGS. 14 to 11, the process for storing energy in a power generator according to an exemplary embodiment of the present invention will be described.

Figure 7:
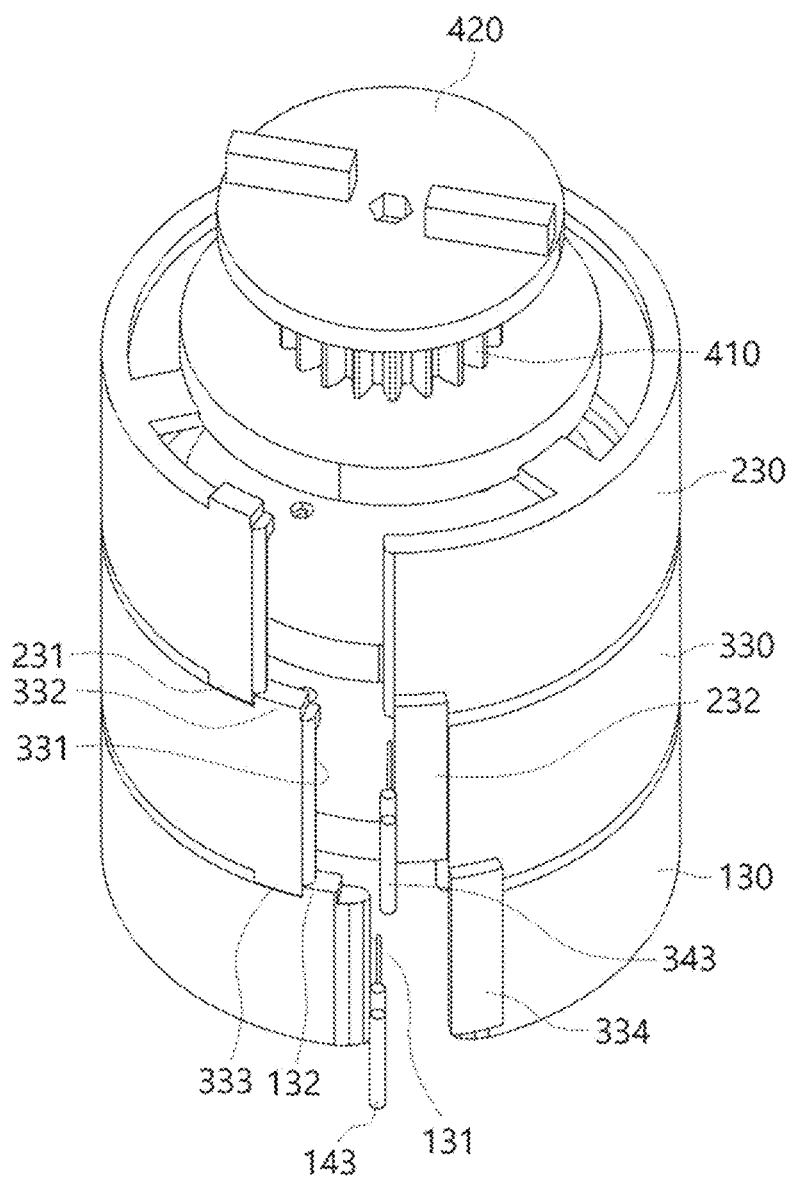
FIG. 7 is a diagram briefly illustrating a second inner case, a third inner case, a first inner case, a third holder and a first holder of the fluid supply device having a power generator according to an exemplary embodiment of the present invention, and it is a diagram showing a step before energy is saved.
Figure 8:
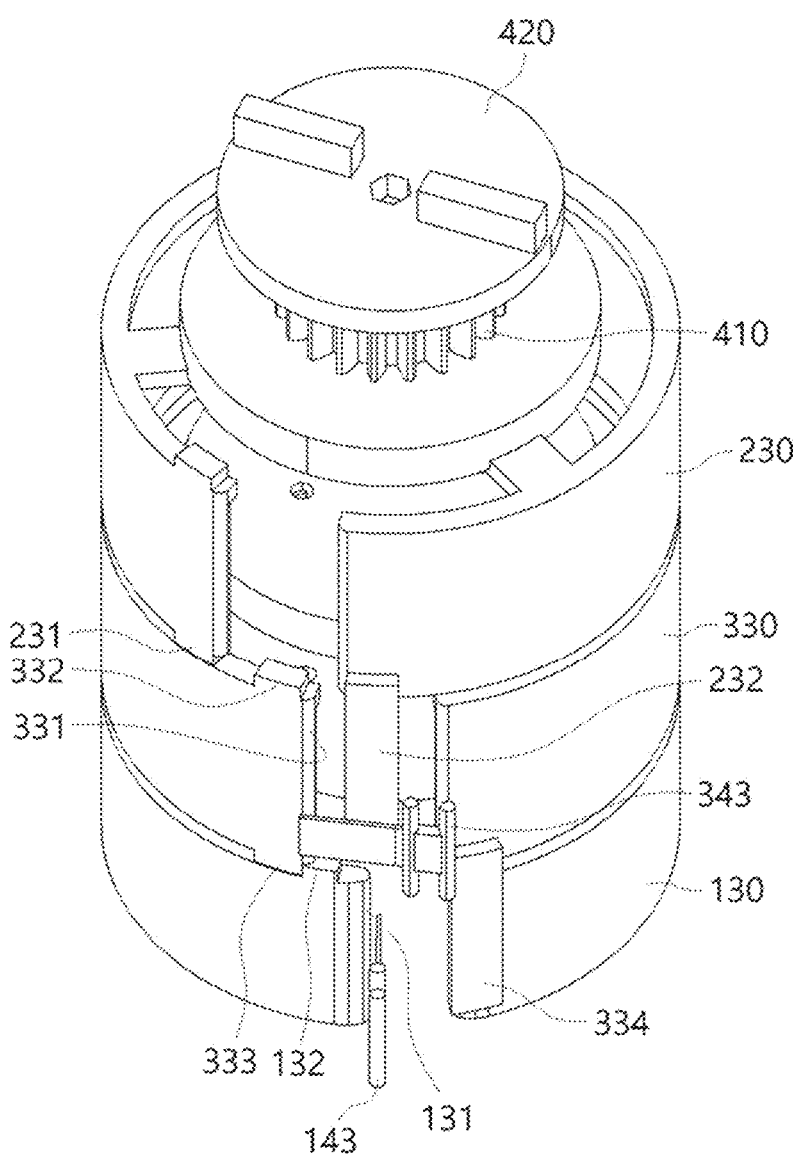
FIG. 8 is a diagram briefly illustrating a second inner case, a third inner case, a first inner case, a third holder and a first holder of the fluid supply device having a power generator according to an exemplary embodiment of the present invention, and it is a diagram showing the process of storing energy in the second mainspring module.
Figure 9:
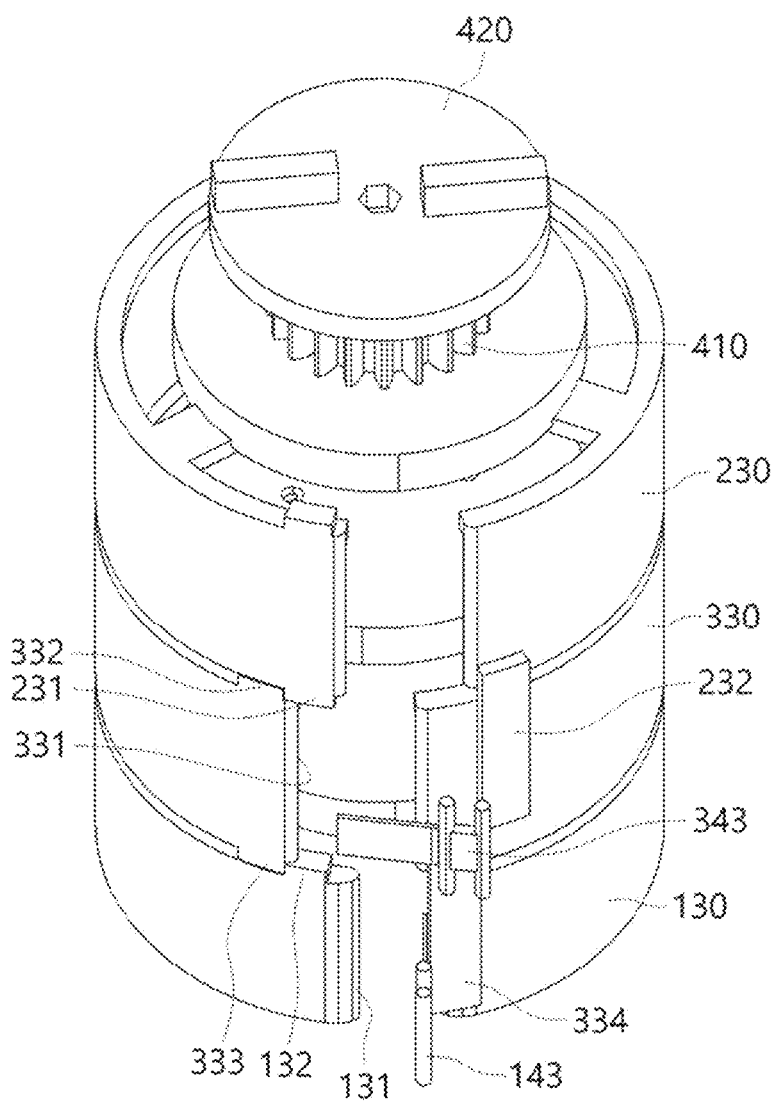
FIG. 9 is a diagram briefly illustrating a second inner case, a third inner case, a first inner case, a third holder and a first holder of the fluid supply device having a power generator according to an exemplary embodiment of the present invention, and it is a diagram showing the process of storing energy in the third mainspring module.
Figure 10:
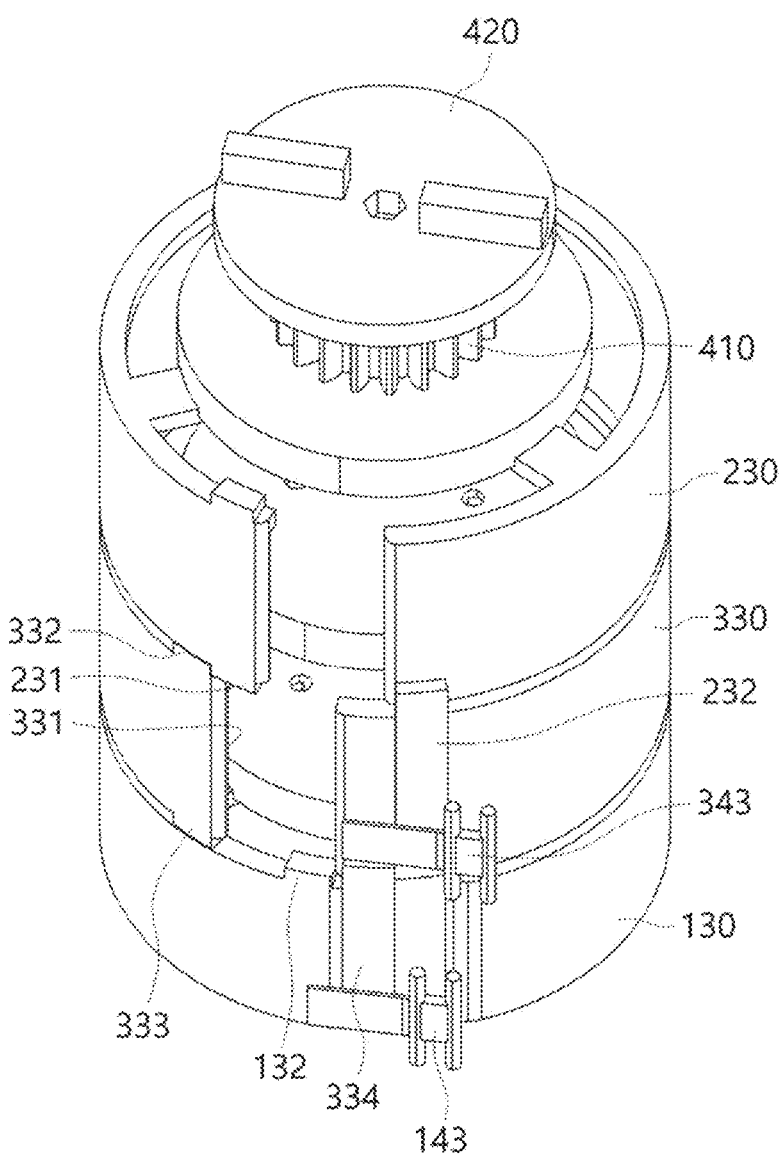
FIG. 10 is a diagram briefly illustrating a second inner case, a third inner case, a first inner case, a third holder and a first holder of the fluid supply device having a power generator according to an exemplary embodiment of the present invention, and it is a diagram showing the process of storing energy in the first mainspring module.

FIG. 7 is a diagram briefly illustrating a second inner case, a third inner case, a first inner case, a third holder and a first holder of the fluid supply device having a power generator according to an exemplary embodiment of the present invention, and it is a diagram showing a step before energy is saved. FIG. 8 is a diagram briefly illustrating a second inner case, a third inner case, a first inner case, a third holder and a first holder of the fluid supply device having a power generator according to an exemplary embodiment of the present invention, and it is a diagram showing the process of storing energy in the second mainspring module. FIG. 9 is a diagram briefly illustrating a second inner case, a third inner case, a first inner case, a third holder and a first holder of the fluid supply device having a power generator according to an exemplary embodiment of the present invention, and it is a diagram showing the process of storing energy in the third mainspring module. FIG. 10 is a diagram briefly illustrating a second inner case, a third inner case, a first inner case, a third holder and a first holder of the fluid supply device having a power generator according to an exemplary embodiment of the present invention, and it is a diagram showing the process of storing energy in the first mainspring module. FIG. 11 is a diagram briefly illustrating a second inner case, a third inner case, a first inner case, a third holder and a first holder of the fluid supply device having a power generator according to an exemplary embodiment of the present invention, and it is a diagram showing a state in which elastic energy is stored in the second mainspring module, the third mainspring module and the first mainspring module.

As illustrated in FIG. 7, before elastic energy is stored in the second mainspring module 220, the third mainspring module 320 and the first mainspring module 120, the first bar 232 and the second bar 334 are disposed on counterclockwise direction sides of the third holder 343 and the first holder 143, respectively.

In this case, the counterclockwise direction side end of the second stopper 231 of the second inner case 230 and the clockwise direction side end of the third stopper 332 of the third inner case 330 come into contact with each other, and the counterclockwise direction side end of the fourth stopper 333 of the third inner case 330 and the clockwise direction side end of the first stopper 132 of the first inner case 130 come into contact with each other.

As illustrated in FIG. 8, when the handle 420 provided at the top of the second inner case 230 is turned in a clockwise direction, the second spring 222 of the second mainspring module 220 is wound, and elastic energy is stored.

In this case, the first bar 232 rotates in a clockwise direction along the outer surface of the third inner case 330. Accordingly, the first bar 232 presses one side of the third holder 343, and the third holder 343 rotates in a counterclockwise direction. Accordingly, as the third elastic body 345 is elastically deformed, one end 343*a* of the third holder is separated from the teeth 323*a* of the third escapement.

As illustrated in FIG. 9, when the user rotates the second inner case 230 sufficiently in a clockwise direction, the second stopper 231 of the second inner case 230 comes into contact with the third stopper 332 of the third inner case 330.

In this case, when the user continuously rotates the second inner case 230 in a clockwise direction by using the handle 420, while the third stopper 332 of the third inner case 330 is supported by the second stopper 231, the third inner case 330 also rotates in a clockwise direction. Accordingly, the third spring 322 of the third mainspring module 320 is wound while the second spring 222 of the second mainspring module 220 remains wound, thereby additionally storing elastic energy.

In this case, as illustrated in FIG. 10, the second bar 334 rotates in a clockwise direction along the outer surface of the first inner case 130. Accordingly, the second bar 334 presses one side of the first holder 143, and the first holder 143 rotates in a counterclockwise direction. Accordingly, as the first elastic body 145 is elastically deformed, one end 143*a* of the first holder is separated from the teeth 123*a* of the first escapement.

When the user further rotates the second inner case 230 sufficiently in a clockwise direction, while the second stopper 231 of the second inner case 230 maintains a state of contacting the third stopper 332 of the third inner case 330, the fourth stopper 333 of the third inner case 330 comes into contact with the first stopper 132 of the first inner case 130.

In this case, when the user continuously rotates the second inner case 230 in a clockwise direction by using the handle 420, the third stopper 332 of the third inner case 330 is supported by the second stopper 231, and while the first stopper 132 of the first inner case 130 is supported by the fourth stopper 333, the first inner case 130 also rotates in a clockwise direction.

Accordingly, while the second spring 222 of the second mainspring module 220 and the third spring 322 of the third mainspring module 320 maintain the wound state, the first spring 122 of the first mainspring module 120 is wound, thereby additionally storing elastic energy.

Figure 11:
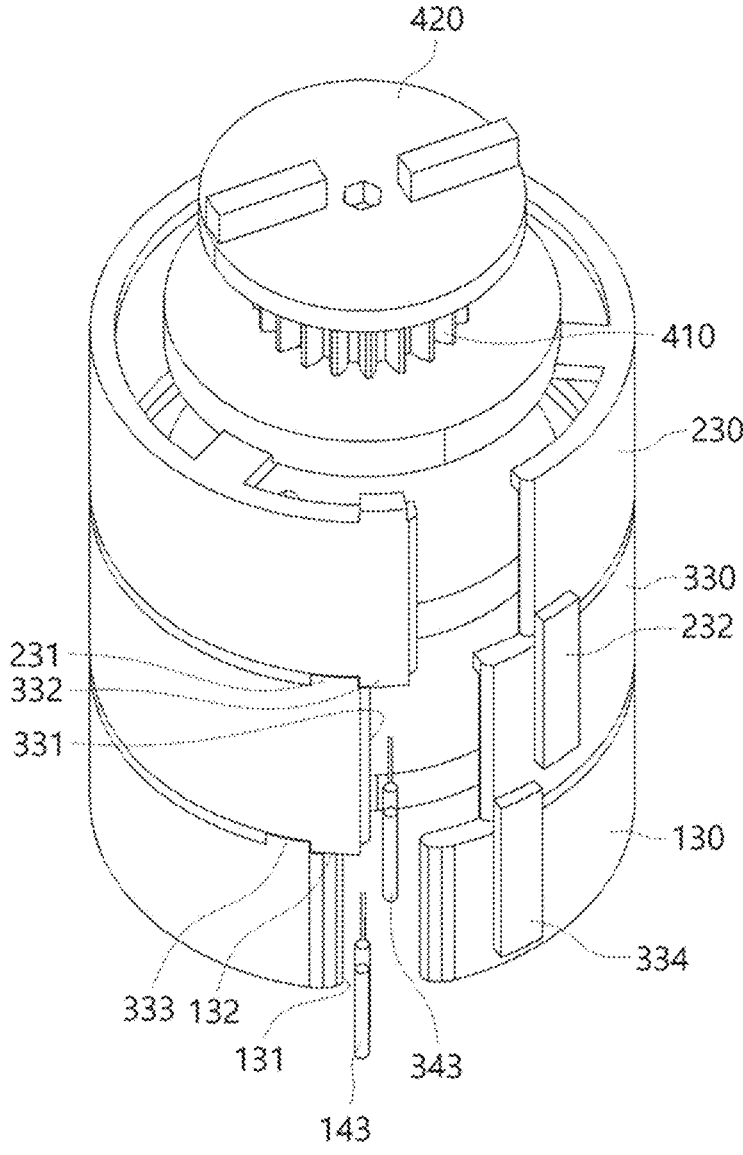
FIG. 11 is a diagram briefly illustrating a second inner case, a third inner case, a first inner case, a third holder and a first holder of the fluid supply device having a power generator according to an exemplary embodiment of the present invention, and it is a diagram showing a state in which elastic energy is stored in the second mainspring module, the third mainspring module and the first mainspring module.

As illustrated in FIG. 11, while all of the elastic energy is stored in the second mainspring module 220, the third mainspring module 320 and the first mainspring module 120, the first bar 232 is positioned on a counterclockwise direction side of the third holder 343, and the second bar 334 is positioned on a counterclockwise direction side of the first holder 143.

Accordingly, one end 343*a* of the third holder is disposed between the teeth 323*a* of the third escapement through the third inner case opening 331 and the third mainspring housing opening 321*a*, and one end 143*a* of the first holder is disposed between the teeth 123*a* of the first escapement through the first inner case opening 131 and the first mainspring housing opening 121*a*.

In this case, the other end 343*b* of the third holder is supported by the first elastic body 145. That is, as the other end 343*b* of the third holder is supported without the third elastic body 345 being deformed, one end 343*a* of the third holder prevents the third escapement 323 from rotating.

Likewise, as the other end 143*b* of the first holder is supported in a state where the first elastic body 145 is not deformed, one end 143*a* of the first holder prevents the first escapement 123 from rotating.

Hereinafter, with reference to FIGS. 12 to 14, the process in which energy stored in a power generator according to an exemplary embodiment of the present invention is converted into kinetic energy to provide a rotational force will be described.

Figure 12:
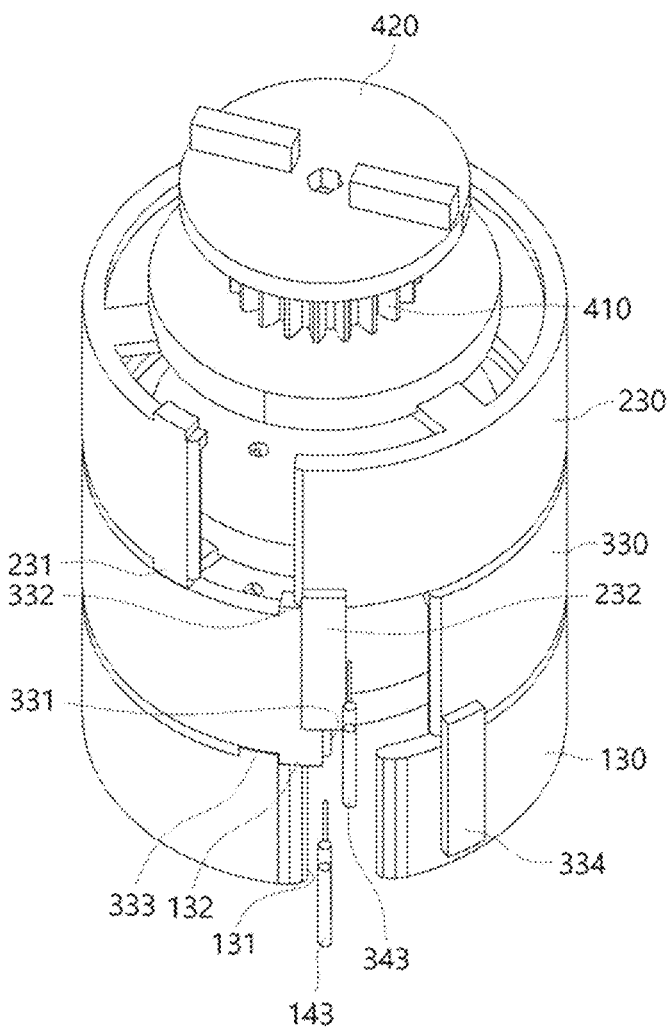
FIG. 12 is a diagram briefly illustrating a second inner case, a third inner case, a first inner case, a third holder and a first holder of the fluid supply device having a power generator according to an exemplary embodiment of the present invention, and it is a diagram showing the process of unwinding the second spring of the second mainspring module.

FIG. 12 is a diagram briefly illustrating a second inner case, a third inner case, a first inner case, a third holder and a first holder of the fluid supply device having a power generator according to an exemplary embodiment of the present invention, and it is a diagram showing the process of unwinding the second spring of the second mainspring module. FIG. 13 is a diagram briefly illustrating a second inner case, a third inner case, a first inner case, a third holder and a first holder of the fluid supply device having a power generator according to an exemplary embodiment of the present invention, and it is a diagram showing the process of unwinding the third spring of the third mainspring module. FIG. 14 is a diagram briefly illustrating a second inner case, a third inner case, a first inner case, a third holder and a first holder of the fluid supply device having a power generator according to an exemplary embodiment of the present invention, and it is a diagram showing the process of unwinding the first spring of the first mainspring module.

As illustrated in FIG. 12, while the unwinding of the first spring 122 of the first mainspring module 120 and the third spring 322 of the third mainspring module 320 is restricted, and the second spring 222 of the second mainspring module 220 begins to be unwound, and the elastic energy stored in the second mainspring module 220 is first converted into kinetic energy.

Accordingly, the second inner case 230 rotates in a counterclockwise direction. In this case, the second inner case 230 rotates in a counterclockwise direction until the second stopper 231 is supported by the third stopper 332.

Figure 13:
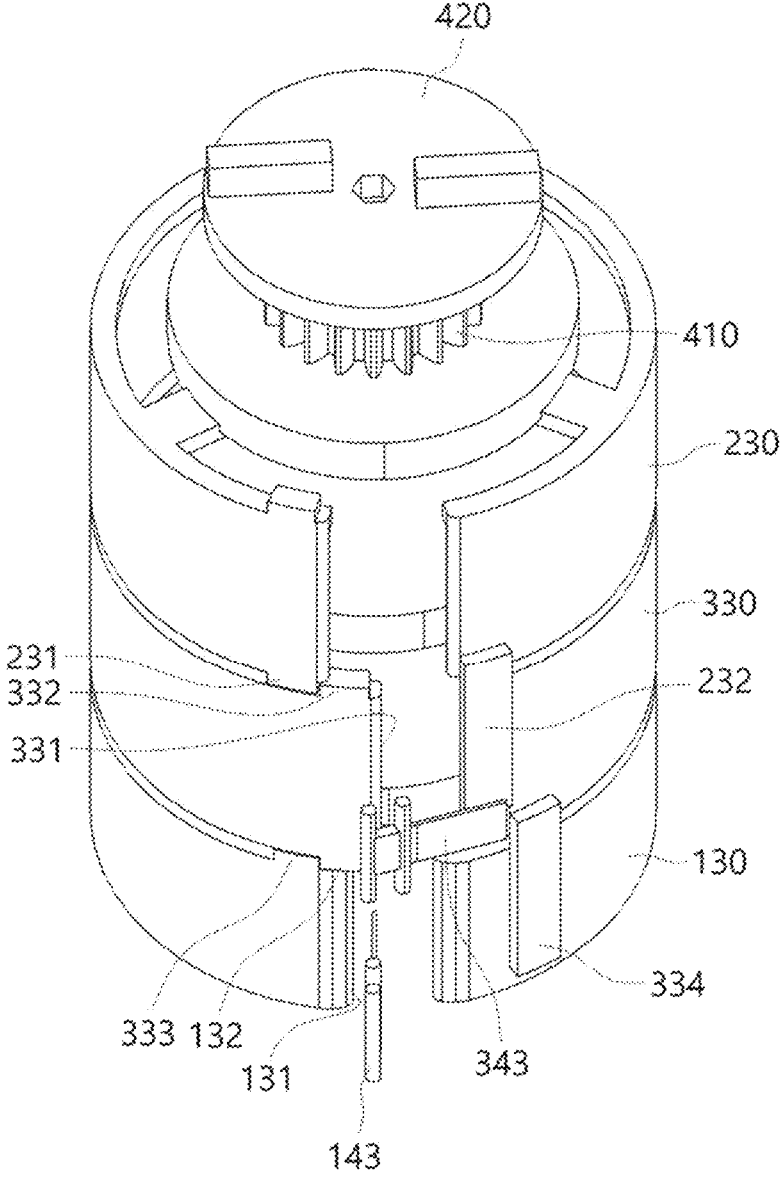
FIG. 13 is a diagram briefly illustrating a second inner case, a third inner case, a first inner case, a third holder and a first holder of the fluid supply device having a power generator according to an exemplary embodiment of the present invention, and it is a diagram showing the process of unwinding the third spring of the third mainspring module.

As illustrated in FIG. 13, at a point where rotation of the second inner case 230 ends, the first bar 232 rotates the third holder 343 in a clockwise direction. In this case, the other end 343*b* of the third holder deforms the fourth elastic body 344 due to the restoring force of the second spring 222. Accordingly, one end 343*a* of the third holder is separated from the teeth 323*a* of the third escapement, and the third escapement 323 can rotate.

As the third escapement 323 can rotate, the energy stored in the third mainspring module 320 is converted into kinetic energy, and the third inner case 330 rotates together with the second inner case 230.

In this case, the third stopper 332 of the third inner case 330 maintains a state of contacting the second stopper 231 of the second inner case 230, and the second bar 334 of the third inner case 330 rotates in a counterclockwise direction between the first inner case 130 and the first outer case 110.

Figure 14:
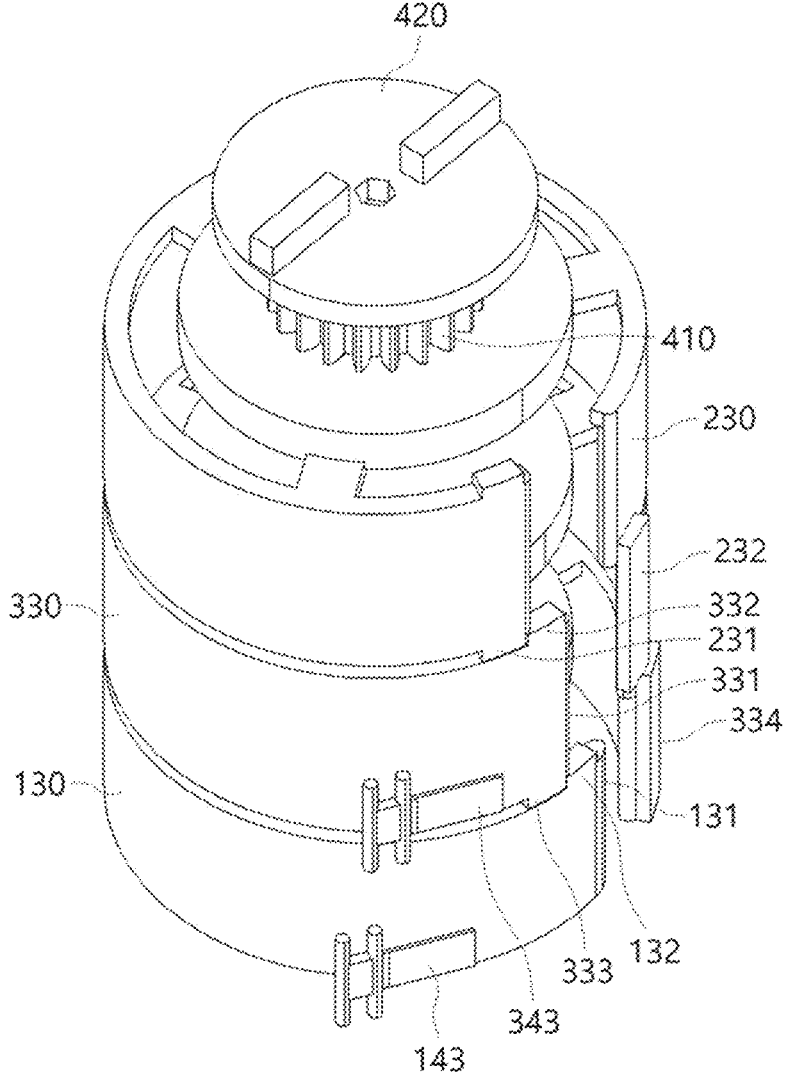
FIG. 14 is a diagram briefly illustrating a second inner case, a third inner case, a first inner case, a third holder and a first holder of the fluid supply device having a power generator according to an exemplary embodiment of the present invention, and it is a diagram showing the process of unwinding the first spring of the first mainspring module.

As illustrated in FIG. 14, the third inner case 330 rotates until the fourth stopper 333 comes into contact with the first stopper 132 of the first inner case 130, and at a point where rotation of the third inner case 330 ends, the second bar 334 rotates the first holder 143 in a clockwise direction.

In this case, the other end 143*b* of the first holder deforms the second elastic body 144 due to the restoring force of the third spring 322. Accordingly, one end 143*a* of the first holder is separated from the teeth 123*a* of the first escapement, and the first escapement 123 can rotate.

As the first escapement 123 can rotate, the energy stored in the first mainspring module 120 is converted into kinetic energy, and the first inner case 130 rotates together with the second inner case 230 and the third inner case 330.

In this way, from the top, since the second spring 222 of the second mainspring module 220, the third spring 322 of the third mainspring module 320, and the first spring 122 of the first mainspring module 120 are sequentially unwound, the power generator according to an exemplary embodiment of the present invention can continuously provide a rotational force.

In this case, in the previous description, it has been explained that the third mainspring module 320, the third inner case 330, and the third outer case 310 are provided, but it will be apparent to those skilled in the art in the technical field of power generators that while the third mainspring module 320, the third inner case 330 and the third outer case 310 are not provided, the second mainspring module 220, the second inner case 230 and the second outer case 210 may be directly coupled on the upper side of the first mainspring module 120, the first inner case 130 and the first outer case 110.

Furthermore, as necessary, a plurality of the third mainspring modules 320, the third inner cases 330 and the third outer cases 310 may be coupled, and accordingly, it will be apparent to those skilled in the art in the technical field of power generators that the power generator can continuously provide rotational forces in proportion to the number added.

Hereinafter, the fluid supply device 1 having a power generator according to an exemplary embodiment of the present invention will be described with reference to FIGS. 1 and 2.

The fluid supply device 1 having a power generator according to an exemplary embodiment of the present invention moves a piston 510 of the injector 500 without power through the rotational force of the power generator, it may discharge a fluid inside the syringe 520 for a certain period of time to the outside.

When this is explained in more detail, as illustrated in FIG. 6, in order to control the linear movement of the piston 510 by using the rotational force of the power generator, a main gear 410 and a handle 420 are formed.

In this case, as illustrated in FIGS. 1 and 6, the main gear 410 is disposed between the handle 420 and the upper surface of the second inner case 230, and the main gear 410 is disposed to have the same rotation axis as that of the second inner case 230.

As illustrated in FIGS. 1 and 2, the second outer case 210 of the power generator is fixed to the housing 400. In this case, the second outer case 210 and the housing 400 may be formed integrally.

A first gear 440 and a second gear 450 which are engaged with the main gear 410 are rotatably fixed to the housing 400. In this case, the gear ratio of the main gear 410 may be determined through the first gear 440 and the second gear 450.

To this end, as illustrated in FIG. 2, the first gear 440 and the second gear 450 may include an outer gear and an inner gear, respectively. In this case, the inner gear and the outer gear rotate in a fixed state to each other even if they are formed integrally with the same rotation axis or manufactured separately. A step may be formed by varying the diameters of the inner gear and the outer gear, and accordingly, various gear ratios may be formed by varying the number of gear teeth.

With the housing 400 fixing the power generator, the main gear 410 rotates by the rotational force provided by the power generator, and as long as the first gear 440 and the second gear 450 are engaged with the main gear 410 and can rotate together, there are no limitations to the shape.

In this case, a cover 430 may be further provided to cover the upper sides of the first gear 440 and the second gear 450. The cover 430 may be formed to cover the entire upper side of the housing 400 as necessary, and may be formed to cover only a part of the upper side of the housing 400 in order to fix the first gear 440 and the second gear 450 on the upper side.

A rack gear 460 which is capable of linear reciprocating motion is coupled to one side of the housing 400. The rack gear 460 is extended in length, and gear teeth are formed on one side surface. The second gear 450 is engaged with the gear teeth of the rack gear 460, and the rack gear 460 can make a forward movement by the second gear 450, which rotates by the rotational force of the power generator.

The rack gear 460 may be coupled to a rail that is formed on the housing 400 to guide linear movement. However, as long as the rack gear 460 can move in a straight line without being separated from the housing 400, there are no limitations to the structure in which the rack gear 460 is coupled to the housing 400. As illustrated in FIG. 2, in the present embodiment, a rail having a vertical cross-section in the longitudinal direction is formed in a 'T' shape in the housing 400, and the rack gear 460 is coupled to the 'T' shaped rail.

Meanwhile, in the present embodiment, a first gear 440 and a second gear 450 are provided, but if necessary, only the first gear 440 may be provided, and a third gear which is not disclosed in the drawings may be further provided.

The injector 500 is fixed to the housing 400 in the linear movement direction of the rack gear 460. To this end, the rack gear 460 and the injector 500 are arranged in a straight line. In this case, a syringe holder 490 is fixed to the housing 400 in order to fix the syringe 520 of the injector 500.

The syringe holder 490 may be fixed to the housing 400 in a replaceable manner. In this case, the wings of the syringe 520 may be inserted and fixed in the syringe holder 490. The size of the syringe holder 490 can be changed depending on the specifications of the syringe 520. Accordingly, injectors 500 having various known specifications may be fixed to the housing 400.

One end of the piston 510 is coupled to the front end of the rack gear 460. In this case, there are no limitations to the way in which the rack gear 460 is coupled to the piston 510. In addition, the rack gear 460 may be replaced along with the syringe holder 490 according to the specifications of the piston 510.

By fixing the syringe 520 to the housing 400 and coupling the piston 510 to the rack gear 460, the rack gear 460 presses the piston 510 in the process of moving forward by the power generator such that even in a field where power is not supplied, the fluid in the syringe 520 into which the other end of the piston 510 is inserted may be discharged from the syringe 520 at a constant flow rate.

In addition, the discharge time from the syringe 520 may be appropriately adjusted by further combining the third mainspring module 320 of the power generator and the above-described configuration for coupling the same.

Meanwhile, in order to prevent the housing 400 from being tilted according to the vertical direction size of the power generator, a leg block 470 may be coupled to the opposite side of a side where the power generator is fixed to the housing 400.

As illustrated in FIG. 1, if a plurality of leg blocks 470 can be coupled in succession, they may be additionally coupled to various positions of the housing 400. Accordingly, the housing 400 may be easily placed in the field by using the leg block 470 and the power generator.

As described above, preferred exemplary embodiments according to the present invention have been examined, and it is apparent to those skilled in the art that the present invention can be embodied in other specific forms without departing from the spirit or scope of the present invention in addition to the above-described exemplary embodiments. Therefore, the above-described exemplary embodiments are to be construed as illustrative rather than restrictive, and accordingly, the present invention is not limited to the above description and may be modified within the scope of the appended claims and their equivalents.

[Explanation of Reference Numerals]

| 1: | Fluid supply device |
|---|---|
| 110: | First outer case |
| 111: | First seating groove |
| 114: | First guide groove |
| 120: | First mainspring module |
| 121: | First mainspring housing |
| 122: | First spring |
| 123: | First escapement |
| 124: | First escapement machine |
| 130: | First inner case |
| 131: | First inner case opening |
| 132: | First stopper |
| 140: | First holder module |
| 141: | First holder cover |
| 142: | First holder case |
| 143: | First holder |
| 144: | Second elastic body |
| 145: | First elastic body |
| 210: | Second outer case |
| 220: | Second mainspring module |
| 221: | Second mainspring housing |
| 222: | Second spring |
| 230: | Second inner case |
| 231: | Second stopper |
| 232: | First bar |
| 310: | Third outer case |
| 311: | Third seating groove |
| 314: | Third guide groove |
| 320: | Third mainspring module |
| 321: | Third mainspring housing |
| 322: | Third spring |
| 323: | Third escapement |
| 324: | Third escapement |
| 330: | Third inner case |
| 331: | Third inner case opening |
| 332: | Third stopper |
| 333: | Fourth stopper |
| 334: | Second bar |
| 340: | Third holder module |
| 341: | Third holder cover |
| 342: | Third holder case |
| 343: | Third holder |
| 344: | Fourth elastic body |
| 345: | Third elastic body |
| 400: | Housing |
| 410: | Main gear |
| 420: | Handle |
| 430: | Cover |
| 440: | First gear |
| 450: | Second gear |
| 460: | Rack gear |
| 470: | Leg block |
| 480: | Gear holder |
| 490: | Syringe holder |
| 500: | Injector |
| 510: | Piston |
| 520: | Syringe |

The invention claimed is:

1. A power generator, comprising:
a first outer case in which a first internal space is formed;

a first mainspring module which has a first spring that provides a rotational force as it is wound and unwound by rotation;

a first inner case which covers the first mainspring module and rotates in a rotational direction about a rotation axis according to the rotational force provided by the first spring;

a second outer case in which a second internal space is formed and which is disposed on one direction side of the first outer case;

a second mainspring module which has a second spring that provides a rotational force as it is wound and unwound by rotation;

a second inner case which covers the second mainspring module and rotates in the rotation direction about the rotation axis according to the rotational force provided by the second spring; and a first holder module which is coupled to the first outer case to limit the unwinding of the first spring until the unwinding of the second spring is completed, wherein the first mainspring module further comprises a first escapement is connected to the first spring and rotates by the rotational force provided by the first spring and having a plurality of teeth formed at predetermined intervals along a periphery, and wherein the first holder module can limit rotation of the first escapement, wherein the first holder module comprises a first holder whose one end extends to be positioned between a plurality of teeth of the first escapement, and wherein the first inner case has a first inner case opening which is formed to provide a space such that the first holder can be positioned between the teeth of the first escapement.

2. The power generator of claim 1, wherein the first mainspring module further comprises a first mainspring housing in which the first spring and the first escapement are disposed and which is disposed in the first internal space.

3. The power generator of claim 1, wherein the first mainspring module further comprises a first escapement machine which is coupled between the first spring and the first escapement to rotate the first escapement at a predetermined rotation speed.

4. The power generator of claim 1, wherein the first holder comprises a pair of first fixing protrusions which respectively protrude in the one direction and in an opposite direction of the one direction, wherein the first outer case has a first seating groove which is formed on one side, and wherein the first holder module further comprises a first holder case which is seated in the first seating groove and is formed with a fixing hole into which the first fixing protrusion can be inserted, and a first holder cover which is coupled to the first holder case with the first holder in the center and is formed with a fixing hole into which the first fixing protrusion can be inserted.

5. The power generator of claim 4, wherein the first outer case further comprises a pair of first guide grooves which extend in the one direction on a rotation direction side of the first seating groove and on an opposite direction side of the rotation direction, and wherein the first holder case further comprises a first guide rail which is inserted into the first guide groove on the rotation direction side of the first seating groove and on the opposite direction side of the rotation direction.

6. The power generator of claim 4, wherein the first holder case has a first holder case opening which is formed to provide a space in which the first holder is placed, and wherein the first holder cover has a pair of first depressions which are formed such that the rotation direction side of the first holder case opening and the opposite direction side of the rotation direction can be inserted.

7. The power generator of claim 6, wherein the first holder case is formed such that the thickness becomes thinner as the ends of the rotation direction side of the first holder case opening and the opposite direction side of the rotation direction approach each other.

8. The power generator of claim 4, wherein the other end of the first holder extends, and wherein the first holder module further comprises a first elastic body which is disposed on the opposite direction side of the rotation direction of the other end of the first holder and elastically deformed by the other end of the first holder as the first holder pivots.

9. The power generator of claim 8, wherein the first holder module further comprises a second elastic body which is disposed on the rotation direction side of the other end of the first holder and elastically deformed by the other end of the first holder as the first holder pivots.

10. The power generator of claim 8, wherein the first holder further has a pair of first guide protrusions at the other end which respectively protrude in the one direction and the opposite direction of the one direction, wherein the first holder case has a first holder case slot into which the first guide protrusion is inserted and which extends to guide the holder as the first holder rotates the first fixing protrusion about a rotation axis, and wherein the first holder cover has a first holder cover slot into which the first guide protrusion is inserted and which extends to guide the holder as the first holder rotates the first fixing protrusion about a rotation axis.

11. The power generator of claim 4, wherein the first holder case is formed integrally with the first outer case.

12. The power generator of claim 1, wherein the second inner case comprises a first bar which protrudes from an outer surface of the second inner case to a space between the first inner case and the first outer case, and wherein the first bar presses one end of the first holder as the second inner case rotates in the rotation direction by the second mainspring module such that one end of the first holder is separated from between a plurality of teeth of the first escapement.

13. The power generator of claim 12, wherein the first inner case has a first stopper which protrudes toward the second inner case, wherein the second inner case has a second stopper which protrudes toward the first inner case, and wherein the second spring is in an unwound state while an end of the second stopper on the opposite direction side of the rotation direction is in contact with an end of the first stopper on the rotation direction side, and is in a wound state while an end of the second stopper on the rotation direction side is in contact with an end of the first stopper on the opposite direction side of the rotation direction.

14. The power generator of claim 13, wherein the first bar is positioned on the rotation direction side of the first holder in the wound state, and rotates around the rotation axis as the second spring is unwound to separate the first holder from the teeth of the first escapement such that the first spring is unwound so as to be positioned on the opposite direction side of the rotation direction of the first holder in the wound state.

15. The power generator of claim 1, further comprising:

a third outer case in which a third internal space is formed and which is disposed between the second outer case and the first outer case;

a third mainspring module which has a third spring that provides a rotational force by winding and unwinding by rotation, and a third escapement which is connected to the first spring, rotates by the rotational force provided by the first spring and has a plurality of teeth formed at predetermined intervals along a periphery;

a third inner case which covers the third mainspring module and rotates in the rotation direction about the rotation axis according to the rotational force provided by the third spring; and a third holder module which has a third holder that extends such that one end can be positioned between a plurality of teeth of the third escapement to limit the unwinding of the third spring until the unwinding of the third spring is completed, and is coupled to the third outer case, wherein the third inner case has a first inner case opening which provides a space such that the first holder can be positioned between the teeth of the first escapement.

16. The power generator of claim 15, wherein the second inner case has a first bar which protrudes from an outer surface of the second inner case to a space between the third inner case and the third outer case, wherein the third inner case has a second bar which protrudes from an outer surface of the third inner case to a space between the first inner case and the first outer case, wherein the first bar presses one side of one end of the third holder as the second inner case rotates in the rotation direction by the second mainspring module such that one end of the third holder is separated from between a plurality of teeth of the third escapement, and wherein the second bar presses one side of one end of the first holder as the third inner case rotates in the rotation direction by the third mainspring module such that one end of the first holder is separated from between a plurality of teeth of the first escapement.

17. A fluid supply device having a power generator, comprising:

the power generator according to claim 1;

a housing in which the power generator is fixed on one side;

an injector comprising a piston which is fixed to the housing and a syringe which is coupled to the piston;

a main gear which is positioned on the one direction side of the second inner case of the power generator and rotates together with the second inner case; and a rack gear which is coupled to the main gear and translates the syringe through a rotational force generated by the power generator.

18. The fluid supply device of claim 17, further comprising:

at least one leg block which is provided to be able to be coupled to the other side of the housing, wherein the at least one leg block has a height equal to a height of the power generator in the one direction.

* * * * *